United States Patent
Kuhstrebe et al.

(10) Patent No.: US 6,881,171 B2
(45) Date of Patent: Apr. 19, 2005

(54) METHOD FOR THE OPERATION OF A MULTIPLE CLUTCHING DEVICE AND A POWER SHIFT TRANSMISSION

(75) Inventors: Jochen Kuhstrebe, Westheim (DE); Thomas John, Alitzheim (DE); Rainer Reuthal, Unterpleichfeld (DE); Thomas Strasser, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/466,346

(22) PCT Filed: Dec. 21, 2001

(86) PCT No.: PCT/EP01/15192

§ 371 (c)(1),
(2), (4) Date: Jul. 14, 2003

(87) PCT Pub. No.: WO02/055910

PCT Pub. Date: Jul. 18, 2002

(65) Prior Publication Data

US 2004/0038776 A1 Feb. 26, 2004

(30) Foreign Application Priority Data

| Jan. 12, 2001 | (DE) | 101 01 176 |
| Oct. 1, 2001 | (DE) | 101 48 429 |
| Dec. 7, 2001 | (DE) | 101 60 308 |

(51) Int. Cl.$^7$ ............................................. B60K 41/02
(52) U.S. Cl. ............................................. 477/78; 74/331
(58) Field of Search ............................. 477/78; 74/331

(56) References Cited

U.S. PATENT DOCUMENTS 5,890,392 A * 4/1999 Ludanek et al. .............. 74/331
6,679,134 B1 * 1/2004 Shigyo ..................... 74/336 R

* cited by examiner

Primary Examiner—Dirk Wright
(74) Attorney, Agent, or Firm—Cohen, Pontani, Lieberman & Pavane

(57) ABSTRACT

In either a pull-mode operating state or a push-mode operating state, a clutch arrangement assigned to the first gearbox input shaft and a clutch arrangement assigned to the second gearbox input shaft are actuated in such a way and a torque-generating arrangement comprising a drive unit is controlled in such a way that, when a shift is to be made between a first gear assigned to a first gearbox input shaft and a second gear assigned to a second gearbox input shaft, at least one of the following criteria with respect to the shifting sequence comprising the shift in question is fulfilled:

(1) during the shifting sequence, the torque present at the gearbox output shaft is at least approximately constant or changes monotonically;

(2) during the shifting sequence, the vehicle accelerates in an essentially monotonically increasing or in an essentially monotonically decreasing manner.

67 Claims, 15 Drawing Sheets

METHOD FOR THE OPERATION OF A MULTIPLE CLUTCHING DEVICE AND A POWER SHIFT TRANSMISSION

PRIORITY CLAIM

This is a U.S. national stage of application No. PCT/EP01/15192, filed on 21 Dec. 2001. Priority is claimed on that application and on the following applications: Country: Germany, Application No.: 101 01 176.8, Filed: 12 Jan. 2001, Country: Germany, Application No.: 101 48 429.1, Filed: 01 Oct. 2001; Country: Germany, Application No.: 101 60 308.8, Filed: 07 Dec. 2001.

BACKGROUND OF THE INVENTION

1. Field of the Invention

The invention pertains to a method for operating a drive train belonging to a motor vehicle, the drive train being provided with:

a torque-generating arrangement, which comprises at least one drive unit, possibly in the form of an internal combustion engine, and possibly an auxiliary unit for generating an auxiliary torque;

a gearbox (especially a power-shift gearbox) with a synchronizing device and with at least two gearbox input shafts and at least one gearbox output shaft, where a first gearbox input shaft is assigned to at least one first gear and a second gearbox input shaft is assigned to at least one second gear;

a multi-clutch device, possibly a double-clutch device, installed between the drive unit and the gearbox to transmit torque between the drive unit and the gearbox, this clutch device comprising a first clutch arrangement assigned to the first gearbox input shaft and a second clutch arrangement assigned to the second gearbox input shaft, where the two clutch arrangements can be actuated independently of each other.

2. Description of the Related Art

A method of this type is known from DE 196 31 983 C1, which corresponds to U.S. Pat. No. 5,890,392. The goal which the method disclosed in this patent document was intended to achieve was to make it possible to shift without the need for any intervention in the management (engine management) of the internal combustion engine, that is, without the need to exert any effect on its power output stage during the shifting method. The method was also intended to make it possible to operate as completely as possible without internal synchronization of the gearbox. According to this approach, it is sufficient to provide a gearbox which requires internal synchronization of the gear wheels for only certain types of shifting, whereas, for other types of shifting, the synchronization is achieved in what could be called an external manner by means of the clutch device.

The method of DE 196 31 983 C1 has the result that the torque acting on the power takeoff element is not constant during the shifting method. As a result, there can be undesirable intermediate accelerations or intermediate decelerations during the course of shifting. These make the ride less comfortable for the driver and the passengers during the shifting operation.

SUMMARY OF THE INVENTION

Against this background, the invention proposes, as a way of guaranteeing a very comfortable ride for the driver and the passengers, that, in at least one operating state from a pull-mode operating state and a push-mode operating state of the drive train or of the motor vehicle, the clutch arrangements are actuated and the torque-generating arrangement is controlled in such a way that, when a shift is being made between a first gear and a second gear, at least one, preferably several, or—most preferably—all of the following criteria pertaining to the shifting sequence comprising the gear shift in question are fulfilled:

(a) during the shifting sequence, a monotonically changing torque, at least some of which is sent by way of the gearbox to the gearbox output shaft and which exerts either an accelerating or a decelerating effect on the vehicle, is present during a transition phase at the gearbox output shaft or on the power takeoff side thereof, where preferably the difference between the torque value at the beginning of the transition phase and the torque value at the end of the transition phase corresponds essentially to the change in the gear ratio of the gearbox which occurs during the shifting method;

(b) during the shifting sequence, the torque present at the gearbox output shaft or on the power takeoff side thereof, at least some of which is being sent via the gearbox to the gearbox output shaft, remains essentially constant before and after the transition phase;

(c) during the shifting sequence, a gearbox input torque, which remains essentially constant and which corresponds for a certain period of time to the sum of a first torque contribution introduced via the first gearbox input shaft and a second torque contribution introduced via the second gearbox input shaft, is introduced into the gearbox via the gearbox input shafts; and (d) during the shifting sequence, it is achieved that the vehicle accelerates in an essentially monotonically rising or in an essentially monotonically falling manner.

When the phrases "monotonically rising" ("monotonically increasing)" and "monotonically falling" ("monotonically decreasing)" are used above and in the following, the idea of "monotonically rising/increasing" means that the variable in question remains constant or is increasing, and the phrase "monotonically falling/decreasing" means that the variable in question remains constant or is decreasing. The terms therefore have the meanings here which they have in mathematics:

A function f is said to be monotonically falling (rising) when, for all $x_1$, $x_2$ in [a, b], where $ax_1 < x_2 b$, it is true that:

$$f(x_1) \geq f(x_2) \ (f(x_1) \leq f(x_2)).$$

In a corresponding manner, the terms "strictly monotonically rising/increasing" and "strictly monotonically falling/decreasing" have the meanings they normally do in mathematics:

The function f is said to be strictly monotonically falling (rising) in [a, b] when, for all $x_1$, $x_2$ in [a, b], where $ax_1 < x_2 b$, it is true that:

$$f(x_1) > f(x_2) \ (f(x_1) < f(x_2)).$$

The term "continuous" used in the following also has the meaning it normally does in mathematics.

According to the inventive proposal, it is provided, for example, that, by means of active intervention in engine management or by the exertion of an active influence on the power output stage of the drive train (possibly an internal combustion engine) and possibly by means of the appropriate activation of the auxiliary unit, the torque (possibly the engine torque) delivered by the torque-generating arrangement is controlled in such a way that torque fluctuations occurring at the power takeoff element as a result of unavoidable acceleration and deceleration methods of the engine and/or of the gearbox input shafts (in general, as a result of unavoidable positive and negative acceleration methods) are compensated. As a result of this compensation, the goal of a monotonically rising or monotonically falling longitudinal acceleration can be achieved.

The minimum of one criterion is preferably fulfilled during upshifting from a lower gear (the starting gear) to a higher gear (the target gear). It is also preferred that the minimum of one criterion is fulfilled during downshifting from a higher gear (the starting gear) to a lower gear (the target gear). If the starting gear is a first gear, then the target gear will be a second gear. If the starting gear is a second gear, the target gear will be a first gear.

According to a preferred realization, the minimum of one criterion is fulfilled both in the pull-mode operating state and also in the push-mode operating state.

It is proposed that, before the engagement of the target gear, the shifting sequence comprise an actuation of the clutch arrangement assigned to the target gear in such a way as to disengage it completely or almost completely. Before and/or during the engagement of the target gear, the shifting sequence can comprise an actuation of the clutch arrangement assigned to the starting gear in such a way as to reduce the torque which can be transmitted by this clutch arrangement. For this purpose it is proposed by way of elaboration that, in the pull-mode operating state, the torque which can be transmitted by the clutch arrangement is adjusted to a value which is approximately the same as the torque provided at that very moment or just before by the torque-generating arrangement. With respect to the push-mode operating state, it is proposed by way of elaboration that, in the push-mode operating state, the torque which can be transmitted by the clutch arrangement is adjusted in such a way that its absolute value is lower than the torque provided at that very moment or just before by the torque-generating arrangement.

Before and/or during and/or after the engagement of the target gear, the shifting sequence can comprise an actuation of the torque-generating arrangement in such a way as to increase or to decrease the torque provided by the torque-generating arrangement.

To meet the demand for the most comfortable ride possible, it can be provided that a torque contribution resulting from an acceleration or a deceleration of a centrifugal mass arrangement which occurs when the target gear is engaged is compensated by allowing the torque-generating arrangement to provide a corresponding compensating torque contribution and/or by appropriately actuating the clutch arrangement assigned to the starting gear.

To "reallocate" the torque to be transmitted from the one clutch arrangement to the other clutch arrangement, it is proposed that the clutch arrangement assigned to the starting gear be made to slip, that the clutch arrangement assigned to the target gear, which is already engaged, be actuated in the engaging direction, and that the clutch arrangement assigned to the starting gear be actuated in the disengaging direction. It preferred that the clutch arrangements be actuated in coordination with each other in such a way that the overall torque transmitted by the two clutch arrangements remains essentially constant. This can be accomplished, for example, by keeping a selected slip speed constant.

During this "reallocation" of the torque to be transmitted, the clutch arrangement assigned to the target gear can be actuated under open-loop control in the engaging direction, and the clutch arrangement assigned to the starting gear can be actuated under closed-loop control in the disengaging direction. Alternatively, the clutch arrangement assigned to the starting gear can be actuated under open-loop control in the disengaging direction, and the clutch arrangement assigned to the target gear can be actuated under closed-loop control in the engaging direction.

The reallocation of the torque to be transmitted from the one gearbox input shaft to the other by the actuation of the clutch arrangements described above (we can speak here of so-called "crossover shifting") results in a corresponding change in the torque present at the gearbox output shaft, because the gear ratio in the starting gear is different from the gear ratio in the target gear. During the "crossover shifting phase", the gear ratio of the starting gear is the determining factor at the beginning, whereas at the end of the "crossover shifting phase", the gear ratio of the target gear is the determining factor. During the course of the crossover shifting phase, the contribution of the gear ratio of the starting gear to the total amount of torque transmitted to the gearbox output shaft becomes smaller, whereas the contribution of the gear ratio of the target gear becomes larger. We can therefore speak justifiably of a continuously changing "effective gear ratio" of the gearbox during the crossover shifting phase, at least with respect to the transmission of the total torque present at the gearbox input shafts to the gearbox output shaft and the resulting transformation of the torque in correspondence with the gear ratios in effect.

With respect to the pull-mode operating state, it is proposed that, in the pull-mode operating state, during or after the time that the torque which can be transmitted by the clutch arrangement assigned to the target gear is adjusted to a value which is approximately equal to the torque being provided at that very moment or just before by the torque-generating arrangement, the torque-generating arrangement be controlled in such a way as to reduce the torque it is providing so that the speed of the torque-generating arrangement is brought to a value which at least approaches that of the gearbox input shaft assigned to the target gear.

With respect to the push-mode operating state, it is proposed that, in the push-mode operating state, during or after the time that the torque which can be transmitted by the clutch arrangement assigned to the target gear is adjusted to a value which is approximately the same as the torque being provided at that very moment or just before by the torque-generating arrangement, the torque-generating arrangement be controlled in such a way and/or the clutch arrangement assigned to the target gear be actuated in such a way that the torque which can be transmitted by this clutch arrangement has an absolute value which is greater than a torque being provided simultaneously by the torque-generating arrangement so that the speed of the torque-generating arrangement is brought to a value which at least approaches that of the gearbox input shaft assigned to the target gear.

To fulfill the demand for an especially comfortable ride, it can be provided that the torque contribution resulting from an acceleration or deceleration of a centrifugal mass arrangement which occurs when the speeds approach each other is compensated, possibly by allowing the torque-generating arrangement to produce a corresponding compensating torque contribution.

In general, it will be advisable to engage the clutch arrangement assigned to the target gear essentially completely during or after the time that the speed of the torque-generating arrangement approaches the speed of the gearbox input shaft assigned to the target gear. The complete "reallocation" of the torque in question from the one clutch arrangement to the other clutch arrangement is over at least by the time this engagement is complete.

To create defined conditions for a subsequent shifting method and to create conditions which are advantageous with respect to the achievement of the goal, it is possible, during or after the time that the speed of the torque-generating arrangement approaches the speed of the gearbox input shaft assigned to the target gear, for the clutch arrangement assigned to the starting gear to be engaged at least far enough that the speed of the gearbox input shaft assigned to the starting gear is brought at least approximately to the speed of the gearbox input shaft assigned to the target gear. In cases where, for example, the demand for a comfortable ride is high, it is possible to compensate for the torque contribution resulting from the acceleration or deceleration of a centrifugal mass arrangement which occurs as the speeds approach each other by allowing the torque-generating arrangement to produce a corresponding compensating torque contribution.

As a rule it will be advisable, during or after the time that the speed of the torque-generating arrangement approaches the speed of the gearbox input shaft assigned to the target gear, for the torque-generating arrangement to be controlled in such a way that it provides a torque which is at least approximately the same as the torque which it was providing before the shifting sequence. As a result, the starting conditions which are thus created for the following shifting method are both defined and advantageous with respect to the achievement of the goal.

In at least one phase of the shifting sequence, the torque provided by the torque-generating arrangement can comprise a torque contribution from the drive unit and a torque contribution from the auxiliary unit. Both of these two contributions can be positive (as in the pull-mode operating state); both contributions can be negative (as in, for example, the push-mode operating state); or one contribution can be positive and the other negative. A negative torque contribution can usually be referred to appropriately as a "drag torque".

A crankshaft starter-generator can be used advantageously as an auxiliary unit. A brake arrangement (such as one formed, for example, by the vehicle brakes or by a separate auxiliary brake at a suitable point on the drive train) can also be considered as a possible auxiliary unit.

In reference to criterion (a) according to the inventive proposal, the transition phase can consist essentially of a crossover shifting phase, during which the clutch arrangements are actuated in opposite directions so that the torque to be transmitted between the drive unit and the gearbox is transferred from the gearbox input shaft assigned to the starting gear to the gearbox input shaft assigned to the target gear. The length of the transition phase and the change in the longitudinal acceleration or deceleration of the vehicle, that is, the acceleration or deceleration gradient, which occurs during this phase are the essential factors in determining how comfortable the vehicle's passengers perceive the ride to be, because the accelerations and decelerations are expressed as changes in the inertial forces acting on the vehicle's occupants. A passenger or possibly the driver can easily compensate for a gradual change in the force of inertia by tensing and relaxing appropriate muscles to an extent which does not affect the comfort of the ride. Such inertial forces or changes in the inertial forces acting on the vehicle's occupants are, to a certain extent, expected during accelerations or decelerations or changes in the rate of acceleration or deceleration.

A ride which is usually comfortable enough can be achieved, for example, by allowing the transition phase to last for approximately 700 ms. The duration of the transition phase can be made dependent, if desired on the gears in question (the starting gear and the target gear), so that, in correspondence with the spread of the ratios, the duration of the transition phase will be different for each starting gear. For example, the lengths of the transition phases can be selected in such a way that a desired deceleration or acceleration gradient is achieved.

If the transition phase consists essentially of the crossover shifting phase, then increasing the duration of this phase to meet the demand for a comfortable ride means that the clutch arrangements of the clutch device must perform a comparatively large amount of friction work. In the case of wet-running double clutches of the disk type, this is usually not a problem, because these clutches are usually able to tolerate the amount of friction work in question here without suffering a significant loss of life-span or service life.

In the case of dry-running clutch arrangements such as those of the friction disk type, however, this comparatively long transition phase (=crossover shifting phase) would mean a very severe or possibly even excessive load on the clutch arrangements, as a result of which a correspondingly short life-span or service life would result. For dry-running clutch arrangements, therefore, the crossover shifting phase should be as short as possible for the sake of the life-span or service life.

The relationship between load or service life on the one hand and the duration of the crossover shifting phase is made particularly clear from the following explanation: The friction power which occurs in a double clutch during crossover shifting and which is in principle independent of the design can be expressed as the product of the transmitted torque times the slip speed (friction power=torque×slip speed). The friction work, which determines the service life in the case of the dry-running double clutch, is therefore essentially proportional to the duration of the crossover shifting phase. Therefore: friction work=friction power×$\Delta t$.

In the case of dry-running clutch arrangements, there is thus conflict between the two goals, namely, between the goal of minimizing the length of the crossover shifting phase for the sake of the reducing the load and increasing the service life and the goal of prolonging the transition to make the shifting as smooth as possible for the sake of a comfortable ride. That is, for the smoothest possible transition, the crossover shifting phase should be as long as possible to avoid any "jerking" during the transfer of torque from the one gearbox input shaft to the other gearbox input shaft.

To solve this conflict between opposing goals and/or to avoid heat problems or to make them easier to control, it is proposed especially for dry-running clutch arrangements, possibly also for wet-running clutch arrangements if desired (e.g., multi-disk clutch arrangements), that the transition phase consist essentially of:

a crossover shifting phase, in which the clutch arrangements are actuated in opposite directions so that the torque to be transmitted between the drive unit and the gearbox is transferred from the gearbox input shaft assigned to the starting gear to the gearbox input shaft assigned to the target gear; and of a gradient phase preceding the crossover shifting phase and/or a gradient phase following the crossover shifting phase, during which a monotonic change is brought about in the torque acting on the vehicle, possibly in the torque present at the gearbox output shaft, by appropriate control of the torque-generating arrangement and/or by appropriate actuation of the clutch arrangement assigned to the starting gear or to the target gear.

On the basis of the realization that the change in the drive torque or drag torque at the gearbox output resulting from the change in the gear ratio associated with shifting is known and that thus, on the basis of the instantaneous torque present just before the shifting sequence, the torque occurring at the end of the shifting sequence is also known or can be determined (the same is also true in principle for the effective longitudinal acceleration or deceleration of the vehicle before and after the shifting method), it is specifically proposed in accordance with an elaborative proposal that the corresponding change in the longitudinal acceleration or deceleration of the vehicle (or the corresponding change in the torque at the gearbox output) be realized not only by the "effective" gear ratio of the gearbox, which is changing continuously during the crossover shifting phase of a power-shift gearbox, but also by other (additional) measures (including intervention in the management of the drive unit (engine management) and/or appropriate actuation of an auxiliary unit which supplies auxiliary torque and/or an appropriate actuation of the clutch arrangements), which can be taken to change the effective drive torque or drag or braking torque in such a way that the inherent change in the longitudinal acceleration or deceleration of the vehicle occurring during the crossover shifting phase is embedded, so to speak, in a preceding and/or subsequent change in the longitudinal acceleration or deceleration achieved by means of the additional measures, which could consist, for example, of intervention in engine management and/or a corresponding actuation of the clutch arrangements. What results is a transition phase which is longer than the crossover shifting phase itself by a period of time equal to the preceding and/or subsequent gradient phase, this longer transition phase being perceived by the vehicle's occupants as a corresponding increase in the duration of the shifting phase. The impression is therefore created that the "crossover shift" includes the preceding and/or following gradient phase. Let us assume by way of example that the transition phase lasts for 700 ms. The crossover shifting phase could, for example, have a duration of 100–150 ms. In this example, therefore, approximately 550–600 ms would belong to at least one gradient phase. Thus a 400–500-ms-long gradient phase could precede the crossover shifting phase, and a 110–150-ms-long gradient phase could follow the crossover shifting phase. To reduce the overall amount of friction work being performed, especially the time segments of the transition phase in which no or only minimal clutch slip occurs should be as long as possible. For example, the gradient phase preceding the crossover shifting phase can be executed in such a way that only slight clutch slip or possibly none at all occurs. It is recommended in this case that the gradient phase preceding the crossover shifting phase be as long as possible.

It should be pointed out that the elaborative proposal of the invention is also of interest in cases such as that of a wet-running double clutch of the disk type in which the load which slip imposes on the clutch arrangements can be controlled in and of itself by appropriate cooling and in which the service life of the double clutch would not be impaired excessively by prolonged crossover shifting phases. Because the friction work is reduced, however, the heat input is also reduced, which means that, by the use of the inventive proposal, the cooling oil circuit would have to be designed to dissipate only relatively small amounts of heat, as a result of which savings in both cost and energy are achieved.

During the crossover shifting phase, the clutch arrangements can be actuated in such a way that a strictly monotonic, preferably a continuous, even more preferably an at least approximately linear change is achieved in the torque present at the gearbox output shaft. It is also proposed that, during the gradient phase preceding the crossover shifting phase and/or during the gradient phase following the crossover shifting phase, the torque-generating arrangement is controlled in such a way and/or the clutch arrangement assigned to the starting gear or to the target gear is actuated in such a way that a strictly monotonic, preferably continuous, most preferably an at least approximately linear change is achieved in the torque acting on the vehicle, possibly in the torque present at the gearbox output shaft. To ensure a ride which is especially comfortable, it is proposed that this control or actuation be carried out in such a way that a strictly monotonic, preferably a continuous, most preferably an at least approximately linear change in the torque acting on the vehicle, possibly in the torque present at the gearbox output shaft, is achieved throughout the entire transition phase.

As already indicated, it is advantageous to provide that the monotonic, preferably continuous, and possibly strictly monotonic or linear change in the torque acting on the vehicle, possibly in the torque present at the gearbox output shaft, during the gradient phase preceding the crossover shifting phase and/or during the gradient phase following the crossover shifting phase, is arrived at on the basis of the change in the torque occurring at the gearbox output shaft associated with the change in the gear ratio which occurs during the shifting operation. In this regard, the idea in particular is to arrive at the monotonic, preferably continuous, and possibly strictly monotonic or linear change in the torque acting on the vehicle, possibly in the torque present at the gearbox output shaft, during the gradient phase in question, on the basis of a nominal torque gradient or a nominal acceleration gradient and/or a predetermined time period for the crossover shifting phase and/or a predetermined time period for the gradient phase in question and/or a predetermined time period for the transition phase and/or a gear ratio assigned to the starting gear and/or a gear ratio assigned to the target gear and/or an instantaneous drive torque or drag torque of the drive unit and/or of a desired drive torque or drag torque of the drive unit.

The proposals offered above, which pertain to the reduction of the friction work or thermal load on the clutch arrangements without causing any significant detriment to the comfort of the ride are in principle applicable to all of the previously discussed types of shifting (pull-mode upshifting, push-mode upshifting, pull-mode downshifting, push-mode downshifting). In the following, more specific elaborative proposals are made for these types of shifting, which are to be interpreted merely as examples or as preferred embodiments and which are in no way to be considered limiting.

With respect to the type of shifting referred to as pull-mode upshifting, it is proposed, for example, that, when upshifting from a lower gear (starting gear) to a higher gear (target gear) in pulling mode, a torque provided by the drive unit and/or the torque transmitted or transmittable by the clutch arrangement assigned to the starting gear be lowered monotonically, preferably strictly monotonically, most preferably linearly, from a starting value to an intermediate value during the gradient phase preceding the crossover shifting phase. It can be advantageous in this case for the drive torque provided by the drive unit to be increased from the intermediate value monotonically, preferably strictly monotonically, most preferably linearly, during the crossover shifting phase. It is proposed by way of elaboration that the drive torque provided by the drive unit be increased to another intermediate value above the starting value during the crossover shifting phase and preferably brought from the second intermediate value to a final value corresponding, if desired, at least approximately to the starting value preferably during the course of the gradient phase following the crossover shifting phase. It can be advantageous here for the drive torque provided by the drive unit to be brought first from the additional intermediate value to a value below the starting value during the gradient phase following the crossover shifting phase and then raised to the final value and/or for a torque transmitted or transmittable by the clutch arrangement assigned to the target gear first to be lowered from the/a intermediate value present at the end of the crossover shifting phase monotonically, preferably strictly monotonically, most preferably linearly during the gradient phase following the crossover shifting phase and for it then possibly to be raised again, especially after the torque provided by the drive unit has reached its final value.

With respect to pull-mode downshifting, it is proposed, for example, that, when downshifting from a higher gear (starting gear) to a lower gear (target gear) in pulling mode, a drive torque provided by the drive unit and/or the torque transmitted or transmittable by the clutch arrangement assigned to the starting gear be raised monotonically, preferably strictly monotonically, most preferably linearly, from a starting value to an intermediate value during the gradient phase preceding the crossover shifting phase. It can be advantageous here for the drive torque provided by the drive unit to be lowered from the intermediate value monotonically, preferably strictly monotonically, most preferably linearly, during the crossover shifting phase.

It is proposed by way of elaboration that the drive torque provided by the drive unit be lowered to another intermediate value below the starting value during the crossover shifting phase and preferably brought from the additional intermediate value to a final value corresponding, if desired, at least approximately to the starting value preferably during the course of the gradient phase following the crossover shifting phase. In this regard, it is advantageous for a torque transmitted or transmittable by the clutch arrangement assigned to the target gear to be raised from the/a intermediate value at the end of the crossover shifting phase monotonically, preferably strictly monotonically, most preferably linearly, to another intermediate value possibly corresponding to the final value during the gradient phase following the crossover shifting phase and then possibly for it to be raised even more, especially after the torque provided by the drive unit has reached the final value.

With respect to push-mode downshifting, it is proposed, for example, that, when downshifting from a higher gear (starting gear) to a lower gear (target gear) in pushing mode, a drag torque applied by the drive unit be reduced monotonically, preferably strictly monotonically, most preferably linearly, from a starting value to an intermediate value during the crossover shifting phase. It is advantageous in this case for the drag torque applied by the drive unit first to be reduced further from the intermediate value during the course of the gradient phase following the crossover shifting phase and then brought to a final value corresponding, if desired, at least approximately to the starting value. It is proposed by way of elaboration that a torque transmitted or transmittable by the clutch arrangement assigned to the target gear be raised monotonically, preferably strictly monotonically, most preferably linearly, from an intermediate value at the end of the crossover shifting phase to another intermediate value, possibly with an absolute value corresponding to the final value, during the gradient phase following the crossover shifting phase, and for it then possibly to be raised even further, especially after the drag torque applied by the drive unit has reached the final value.

With respect to push-mode upshifting, it is proposed, for example, that, when upshifting from a lower gear (starting gear) to a higher gear (target gear) in pushing mode, a drag torque applied by the drive unit be reduced monotonically, preferably strictly monotonically, most preferably linearly, from a starting value to an intermediate value during the gradient phase preceding the crossover shifting phase and/or for the torque transmitted or transmittable by the clutch assigned to the starting gear to be lowered monotonically, preferably strictly monotonically, most preferably linearly, from a starting value to an intermediate value during the gradient phase preceding the crossover shifting phase. It can be advantageous here for the absolute value of the torque which can be transmitted by the clutch arrangement assigned to the starting gear to be lowered during the gradient phase to a value below the drag torque applied by the drive unit.

It is advantageous for the transition phase to be formed at least in part by a braking phase, during which a monotonic change in the torque acting on the vehicle is brought about by appropriate actuation of a/the brake arrangement of the vehicle, possibly of the vehicle brakes acting on the running wheels of the vehicle, preferably at least part of the braking phase being coordinated with an actuation of at least one of the clutch arrangements. In reference to the elaborative proposal pertaining to the "prolongation" of the crossover shifting phase by at least one gradient phase, the gradient phase preceding the crossover shifting phase, for example, and/or the gradient phase following the crossover shifting phase can be formed at least in part by a braking phase.

In general, the idea is to replace a braking torque of the drive unit occurring in pushing mode during at least one phase of the shifting sequence at least partially with a substitute braking torque applied by a/the brake arrangement of the vehicle, preferably by a substitute braking torque applied by the vehicle brakes acting on the running wheels of the vehicle. As a result of the replacement of the braking torque by the substitute braking torque, undesirable positive accelerations or undesirable temporary pauses in vehicle deceleration can be advantageously avoided in cases where, for example, the drive unit (possibly an internal combustion engine) is being used as part of the active synchronization method pertaining to the target gear.

In this regard, it is also proposed that the substitution be provided in such a way that, in coordination with each other, (i) the clutch arrangement which is assigned to the starting gear and which was previously introducing the braking torque of the drive unit into the gearbox is actuated in the disengaging direction, and (ii) the brake arrangement is actuated so as to produce the substitute braking torque.

It can be advantageous, at least at the beginning, for the substitute braking torque to correspond essentially to the braking torque transmitted previously by the clutch arrangement assigned to the starting gear, where this clutch arrangement, as a result of its actuation in the disengaging direction, preferably is no longer transmitting a significant amount of torque, or, at least at the beginning, for a total braking torque consisting of the substitute braking torque and a residual torque still being transmitted by the clutch arrangement assigned to the starting gear to correspond essentially to the braking torque transmitted previously by the clutch arrangement assigned to the starting gear.

It is proposed by way of elaboration that the substitute braking torque be reduced continuously, in coordination with an actuation of the clutch arrangement assigned to the target gear in the engaging direction and/or in coordination with a change in the instantaneous torque provided by the drive unit, this change proceeding in the direction of a reduction in the positive instantaneous drive torque of the drive unit or in the direction of an increase in the instantaneous braking torque of the drive unit. With respect to the previously explained goals, the substitute braking torque can be reduced in such a way that the total braking torque acting on the vehicle as a result of the instantaneous torque provided by the drive unit and the instantaneous braking action of the brake arrangement changes monotonically, preferably strictly monotonically. In this connection is it preferred that the substitute braking torque be reduced in correspondence with a continuous change in the torque being introduced via the clutch device into the gearbox on the basis of the torque provided by the drive unit and preferably that it then essentially disappear by the time the clutch arrangement assigned to the target gear is transmitting essentially all of the braking torque or a predetermined braking torque of the drive unit.

In this connection, it should be remembered that the driver could decelerate the vehicle while driving by actuating the brake pedal. As a result, a downshift in pushing mode might become necessary because of the decrease in engine speed or driving speed. This push-mode downshift can take place with the help of the brakes as explained above. Thus, before and/or during a crossover shifting phase (if provided) or an active synchronization, the braking torque can be increased beyond the braking torque previously achieved already by actuation of the brake pedal. As far as the braking torque is concerned, the shifting sequence then starts, so to speak, with the braking torque initiated by the driver. Under certain conditions, therefore, the braking torque should not be reduced to zero after "shifting" has been completed but rather to the braking torque specified by the driver or to the braking torque which was present before the "shift".

With respect to the previously discussed goal of minimizing the load on the synchronizing device or devices of the gearbox, especially during push-mode downshifting, it is proposed as being especially advantageous that favorable conditions be created for a push-mode downshift from a higher gear (starting gear) to a lower gear (target gear) during a preparatory phase of the shifting sequence by:

disengaging essentially completely the clutch arrangement assigned to the starting gear;

controlling the drive unit to provide a positive drive torque; and bringing the clutch arrangement assigned to the target gear into a partially engaged state corresponding to the partial engagement of the clutch arrangement, in which an acceleration torque can be transmitted, so that, by means of the positive drive torque transmitted by this clutch arrangement, the gearbox input shaft assigned to the target gear accelerates along with the drive unit itself toward a synchronous speed assigned to the target gear. With respect to the engagement of the target gear, it is proposed specifically in this connection that the target gear be engaged when the speed of the gearbox input shaft assigned to the target gear is essentially equal to the synchronous speed or has approached the synchronous speed to within a predetermined threshold range of the speed differential. This has the result of decreasing the load on the synchronizing devices of the gearbox without making it necessary to accept an interruption in the pulling or pushing force.

As a rule, it will be advisable to control the drive unit in such a way as to reduce the positive drive torque and to provide a braking torque at least by the time the target gear has been engaged. The torque provided by the drive unit is preferably changed continuously until the braking torque being provided has reached a predetermined value, possibly the value prevailing at the beginning of the shifting sequence.

Although the continuity of the pulling force or pushing force according to the invention is always desirable for reasons of a comfortable ride, in certain situation it can be acceptable to interrupt the pulling or pushing force despite the resulting loss of comfort in order to limit or to minimize the friction work in the clutch arrangements during a crossover shifting phase and/or in the synchronizing device or devices of the gearbox. It is therefore possible to make a distinction between first and second pull-mode operating states, where, in the case of pull-mode operating states of the first type, the clutch arrangements are actuated and the torque-producing arrangement controlled in such a way when upshifting and/or downshifting between the first gear and the second gear that at least one of criteria (a)–(d) pertaining to the shifting sequence is fulfilled and where, for the pull-mode operating states of the second type, in the absence of the fulfillment of at least one of the criteria (a)–(d) pertaining to the shifting sequence, the shifting sequence is carried out in such a way that an interruption in the pulling force occurs. In addition, it is also possible to make a distinction between first and second push-mode operating states, where, for the push-mode operating states of the first type, the clutch arrangements are actuated and the torque-producing arrangement controlled in such a way when upshifting and/or downshifting between the first gear and the second gear that at least one of criteria (a)–(b) pertaining to the shifting sequence is fulfilled, and where, for the push-mode operating states of the second type, in the absence of the fulfillment of at least one of criteria (a)–(b) pertaining to the shifting sequence, the shifting sequence is carried out in such a way that an interruption in the pushing force occurs.

The invention also pertains to a drive train, possibly in a motor vehicle, comprising:

a torque-generating arrangement, which comprises at least one drive unit, possibly in the form of an internal combustion engine, and, if desired, an auxiliary unit for producing an auxiliary torque;

a gearbox (especially a power-shift gearbox) with a synchronizing device and with at least two gearbox input shafts and at least one gearbox output shaft, where a first gearbox input shaft is assigned to at least one first gear and a second gearbox input shaft is assigned to at least one second gear;

a multi-clutch device, possibly a double-clutch device, installed between the drive unit and the gearbox to transmit torque between the drive unit and the gearbox, which clutch device has a first clutch arrangement assigned to the first gearbox input shaft and a second clutch arrangement assigned to the second gearbox input shaft, where the two clutch arrangements can be actuated independently of each other.

According to the invention, the drive train can be provided with a control unit, which is designed to control the torque-generating arrangement according to the method of the invention and to actuate the clutch device according to the method of the invention in conjunction with a shift between a first and a second gear for the purpose of:

maintaining the torque being provided by way of the gearbox to the gearbox output shaft at an at least approximately constant level before and after a transition phase, during which a monotonic change occurs in the torque transmitted by way of the gearbox to the gearbox output shaft, this change preferably corresponding essentially to the change in the gear ratio which occurs during the shift; and/or achieving a vehicle acceleration which either rises or falls in an essentially monotonic manner; and/or achieving a ride with a desired degree of comfort.

As already mentioned, the auxiliary unit can be a crankshaft starter-generator. It is also possible to provide or to use a brake arrangement, possibly the vehicle brakes acting on the running wheels of the vehicle, as the auxiliary unit. The clutch arrangements can be advantageously designed as wet-running disk clutch arrangements. The idea is to use, for example, a multi-clutch device, especially a double-clutch device, as disclosed in various patent applications of the applicant. Reference is made in particular to U.S. Pat. Nos. 6,464,059, 6,454,074, 6,471,026, 6,499,578, 6,491,149, and 6,523,657, the disclosures of which are hereby incorporated by reference. The clutch arrangements can also be dry-running clutch arrangements, however (e.g., of the friction disk type). Reference is made by way of example to the double-clutch designs disclosed in U.S. Pat. No. 4,714,147.

DETAILED DESCRIPTION OF THE PRESENTLY PREFERRED EMBODIMENTS

Figure 1:
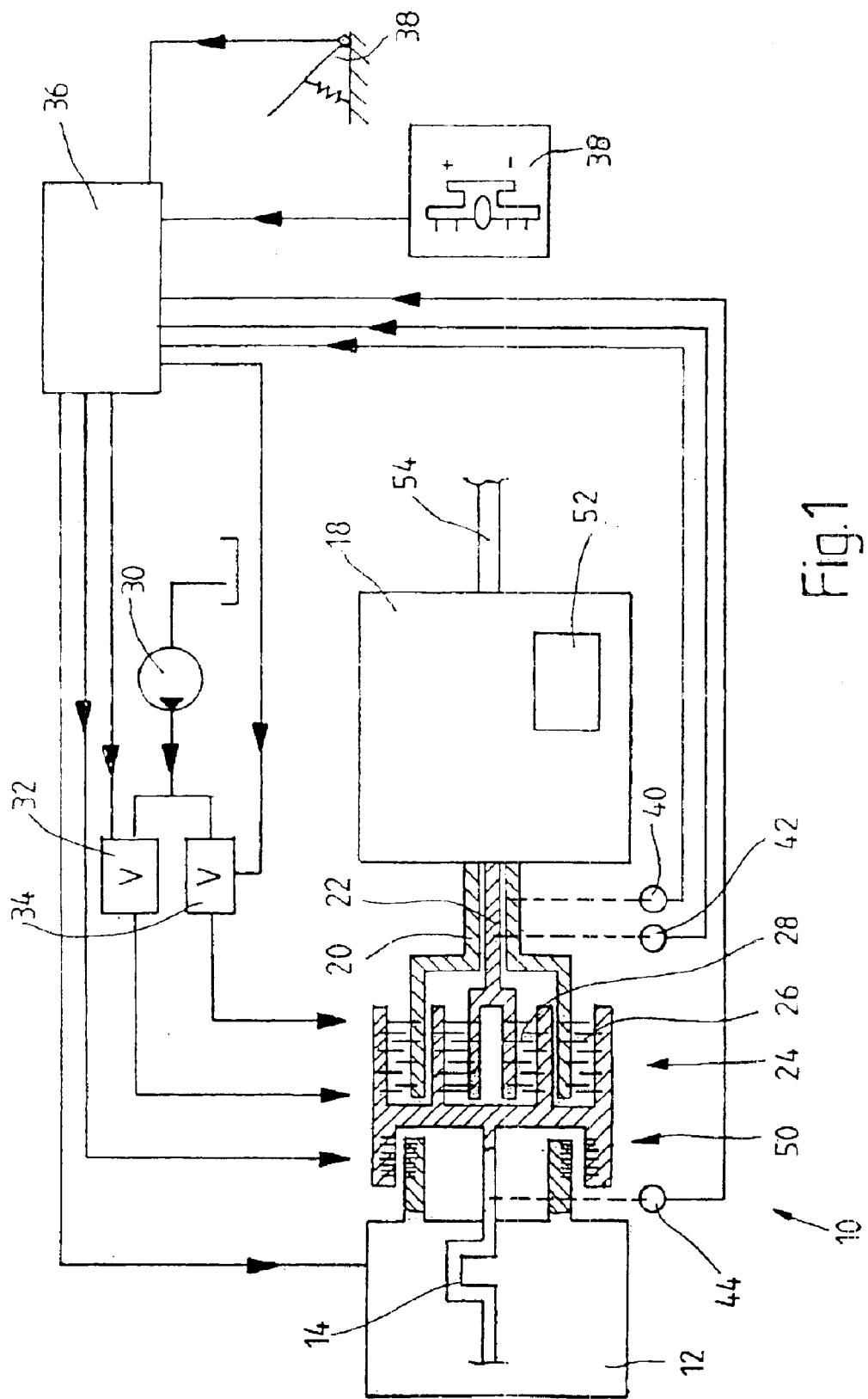
FIG. 1 show a schematic diagram of a drive train which can be operated according to a method of the invention and which has a control unit, which works according to a method of the invention.

FIG. 1 shows an example of a drive train 10 of a motor vehicle. The drive train has a drive unit 12 in the form of a combustion engine, especially an internal combustion engine, as indicated by the symbol for a crankshaft 14. A so-called power-shift gearbox 18 with two concentric gearbox input shafts 20 and 22 is connected by a double clutch 24 to the engine 12. The double clutch 24 comprises two clutch arrangements 26 and 28, one of which is assigned to the gearbox input shaft 20, the other to the gearbox input shaft 22. The exemplary embodiment shows wet-running disk clutch arrangements, each of which is actuated hydraulically by its own hydraulic slave cylinder (not shown), integrated into the double clutch. An appropriate hydraulic pump 30 is indicated schematically. A cooling oil circuit and its cooling oil pump, etc., assigned to the double clutch are not shown. Suitable double-clutch designs are described in, for example, DE 100 04 179 A1.

The two clutch arrangements are actuated via control valves 32 and 34, which can be electrically actuated by a control unit 36. The control unit receives input signals from a gas pedal 37, a gear-selecting and/or influencing unit 38, a speed sensor 40 assigned to the gearbox input shaft 20, a speed sensor 42 assigned to the gearbox input shaft 22, and a speed sensor 44 assigned to the engine power takeoff shaft (crankshaft 14). The control unit can also receive additional signals and measurement values from other sensors and signal sources such as a vehicle velocity sensor, a steering angle sensor, a brake actuation status sensor, etc.

By comparing the speed obtained from the speed sensor 44 with the speed obtained from the speed sensor 40 or 42, the control unit can determine when the clutch arrangement 26 or clutch arrangement 28 is slipping. The control unit 36 controls a power output stage of the engine 22 to adjust the power delivered by the engine, i.e., the torque delivered by it. The delivered torque can also be a negative torque (drag torque). According to a preferred embodiment of the drive train, this drive train has, for example, an additional unit between the engine 12 and the double clutch 24 to produce a positive or a negative torque. This auxiliary unit can be, for example, a crankshaft starter-generator, which serves to start the engine, but which can also be used as a generator. FIG. 1 shows a crankshaft starter-generator 50, which has a stator arrangement mounted on the engine 12 and a rotor arrangement mounted on the input side of the double clutch 24. The crankshaft starter-generator 50 is activated by the control unit 36 to provide a positive or a negative torque as needed.

It should also be mentioned in regard to the power-shift gearbox 18 that it is preferably a fully synchronized gearbox with an appropriate synchronizing device 52. The synchronizing device 52 does not have to be a central synchronizing device for the entire gearbox. The synchronizing device can also be formed by conventional synchronizing means, such as in the form of synchronizing rings. A power takeoff shaft of the gearbox is designated by the reference number 54.

In the following, exemplary shifting sequences are explained with reference to FIGS. 2–5; these sequences realize execution variants of an operating method according to the invention for a drive train such as the drive train of FIG. 1. The shifting sequences can be realized under the control of the control unit 36 by appropriate actuation of the drive unit 12, of the clutch arrangements 26 and 28, and, to the extent required, of the auxiliary unit 50, possibly as a function of parameters predetermined by the unit 38. The shifting sequences are preferably carried out by the control unit 36 in a fully automated manner.

In the following explanations, reference is made to gearbox input shafts 1 and 2, to clutches 1 and 2, and to gears 1 and 2. Gearbox input shaft 1 can correspond to the shaft 20, and gearbox input shaft 2 can corresponding to the shaft 22 or vice versa. Accordingly, clutch 1 can correspond to the clutch arrangement 26, and clutch 2 can correspond to the clutch arrangement 28, or vice versa. Gear 1 is a gear (the starting gear) assigned to gearbox input shaft 1, and gear 2 a gear (the target gear) assigned to gearbox input shaft 2.

Shifting Sequence: Pull-Mode Upshifting

Assumption: In pull mode, a shift is made from a lower gear 1 assigned to gearbox input shaft 1 to a higher gear 2, assigned to gearbox input shaft 2.

During the type of shifting known as pull-mode upshifting, the engine is delivering a positive torque to the gearbox. This torque is transmitted via gearbox input shaft 1. Clutch 1 is connected to gearbox input shaft 1, clutch 2 to gearbox input shaft 2. In the starting state, the two clutches are completely closed and thus in a state of "overcompression". The two gearbox input shafts are therefore turning at the speed of the engine. A gear is engaged on gearbox input shaft 1, and thus the flow of force is established between gearbox input shaft 1 and the gearbox output shaft.

A preferred shifting sequence comprising five shifting phases is explained in the following on the basis of FIG. 2. The shifting phases designated by the Arabic numerals 1–5 in FIG. 2 correspond to the following phases I–V. Possible variants and embodiments of the shifting phases are illustrated in broken line in FIG. 1 and are explained separately below as "alternatives" to the shifting phase in question. So that the various curves and sections of curves can be differentiated, they are provided with the symbols $N_{Mo}$ for the engine speed, $N_{G1}$ for the speed of gearbox input shaft 1, $N_{G2}$ for the speed of gearbox input shaft 2, $M_{Mo}$ for the engine torque, $M_{K1}$ for the torque of clutch 1, and $M_{K2}$ for the torque of clutch 2. The additional contribution to the change in speed which is made by the positive longitudinal acceleration of the vehicle and which represents the change in the vehicle's velocity is not taken into account in the speed sub-diagram. In addition, for the sake of simplicity, it is assumed that the engine torque remains constant in and of itself (without active intervention in engine control) versus the engine speed. The shifting method calculated from the beginning of shifting phase 1 to the end of shifting phase 5 could take, for example, approximately 0.5–1 second.

Phase I:

To initiate the shifting method, clutch 2 is opened completely.

Phase II:

The clutch torque of clutch 1, i.e., $M_{K1}$, is lowered to the current torque of the engine $M_{Mo0}$. In addition, a gear which is higher than the gear engaged on gearbox input shaft 1 is engaged on gearbox input shaft 2. This leads via the synchronizing device of the gearbox to a drop in the speed of gearbox input shaft 2 to the synchronous speed corresponding to the engaged gear.

Phase III:

The engine torque is briefly increased by appropriate intervention in engine management to a value above the clutch torque of clutch 1, $M_{K1}=M_{Mo0}$. This leads to an increase in the speed of the engine beyond the speed of gearbox input shaft 1 and accordingly causes clutch 1 to slip. To prevent any further increase in engine speed, the engine torque is lowered again to the original engine torque $M_{Mo0}$. Because of the resulting equilibrium between the torques, the slipping continues.

Thus clutch 1 is slipping, and a selected slip speed (for example, a differential speed of approximately 10–20 rpm) is automatically adjusted via clutch 1. After the selected slip speed of clutch 1 has been reached, clutch 2 is closed under open-loop control. As that is happening, clutch 1 is actuated under closed-loop control in such a way that the selected slip speed remains preserved. As a result, the open-loop-controlled closing of clutch 2 brings about a closed-loop-controlled opening of clutch 1, because the previously selected slip speed can be kept constant only if the sum of the torques $M_{K1}+M_{K2}$, which are transmitted from the two clutches to the gearbox input shafts and thus—via the gearbox—to the gearbox output shaft, remains constant and equal to the selected engine torque:

$$M_{K1}+M_{K2}=M_{Mo0}.$$

Clutch 2 accepts more and more engine torque until clutch 1 is completely open. Clutch 2 can now transmit all of the engine torque $M_{Mo0}$ and is not closed any further.

Phase IV:

Because the engine and thus also the engine-side half of clutch 2 are turning at the speed of gearbox input shaft 1+the slip speed, whereas the gearbox-side half of clutch 2 is turning at the speed of gearbox input shaft 2, the engine speed is now reduced to the speed of gearbox input shaft 2 by the active lowering of the engine torque to $M_{Mo1}$ below the clutch torque $M_{K2}=M_{o0}$ (that is, by appropriate intervention in engine management). The braking of the engine brings an additional torque $M_{RotMot}=2\pi J_{Mot}dn/dt$, which comes from the energy $E_{RotMot}=\frac{1}{2}J_{Mot}\omega^2$ stored in the flywheel of the engine, to gearbox input shaft 2 and thus to the gearbox output shaft.

The total amount of torque applied to the gearbox output shaft corresponds—without consideration of a transmission factor associated with the gear ratio present in the target gear—to the amount of torque which clutch 2 can transmit and consists of the following components:

$$M_{Mo1}+M_{RotMot}=M_{Mo0}.$$

The lowering of the engine torque corresponds to the torque contribution made by the braking of the engine. Thus, while the engine is being braked, no additional torque is applied to the gearbox output shaft. As indicated, the gear ratio has not yet been taken into consideration in the torque equation given above. Strictly speaking, $M_{Mo0}$ is the torque transmitted to gearbox input shaft 2, which is equal to the torque transmitted to the gearbox output shaft only in the case of a ratio of 1:1. For a different ratio, it is also necessary to take into account the factor which indicates how the torque is transformed at the gear ratio in question.

Clutch 1, now completely open, makes it possible, as if there were no torque, to disengage the gear which had been engaged on gearbox output shaft 1.

Phase V:

Clutch 2 is completely closed. Clutch 1 is closed, which leads to a lowering of the speed $N_{G1}$ of the gearbox input shaft 1 to the level of gearbox input shaft 2. The engine torque is returned to the original value $M_{Mo0}$.

Phase I (alternative):

It is possible to close clutch 2 before the beginning of the shifting sequence only to the extent that the drag torque being transmitted is sufficient to keep gearbox input shaft 2 at the speed of the engine. This has no effect on how the engine is controlled at any time during the shifting sequence.

Phase II (alternative):

The engagement of a gear higher than that on gearbox input shaft 1 now leads necessarily to a braking of gearbox input shaft 2. The associated gain in energy:

$$E_{RotG2} = J_{G2} \int_{n1}^{n2} \omega \, dt$$

would, in the case of static engine torque, bring the additional torque $$M_{G2} \propto \frac{d^2}{dt} E_{RotG2}$$

to the gearbox output shaft, which would lead to an undesirable intermediate acceleration of the vehicle. To suppress this intermediate acceleration, the engine torque $M_{Mo1}$ is lowered during the synchronizing method to such an extent that the sum of the engine torque $M_{Mo1}$ and the gearbox input shaft torque $M_{G2}$ of gearbox input shaft 2 remains equal to the engine torque $M_{Mo0}$ present before the synchronization method:

$$M_{total} = M_{Mo0} = M_{Mo1} + M_{G2}.$$

As a rule, the effect involving the torque contribution resulting from the braking of gearbox input shaft 2 will be small, which means that, in the exemplary embodiment being described here, the compensation of this torque contribution by a corresponding reduction in the engine torque is not a mandatory measure.

Phase III (alternative):

If the current engine torque $M_{Mo0}$ is already equal to the maximum available engine torque $M_{max}$, the engine torque cannot be increased above $M_{Mo0}$ by normal intervention in engine management.

To achieve the slip speed required for automatic control of the clutch, the additional torque to be applied in excess of $M_{max}$ can be delivered by an OVERBOOST function of the engine and/or by an auxiliary unit, such as by a crankshaft starter-generator.

And/or:

The sum of the torques $M_{K1} + M_{K2}$ which is transmitted by the two clutches to the gearbox output shaft must remain below the selected engine torque $M_{Mo0}$ until the desired slip speed has been reached:

$$M_{K1} + M_{K2} < M_{Mo0}.$$

And/or:

It is also possible for the differential speed (engine speed–gearbox input shaft speed of gearbox input shaft 2) to be defined as the slip speed and for it to be adjusted under closed-loop control by clutch 2. Clutch 1 would then be opened under open-loop control, and clutch 2 would be closed under closed-loop control.

Phase V (alternative):

The acceleration energy $$E_{RotG1} = \frac{1}{2} J_{G1} (\omega_{G1} - \omega_{G2})^2$$

being liberated in conjunction with the braking of gearbox input shaft 1 can, as in Phase II, be compensated by the lowering of the engine torque by $$M_{G1} = 2\pi J_{G1} \frac{dn1}{dt}$$

below the original level $M_{Mo0}$. Then the engine torque is raised back to the original level $M_{Mo0}$.

As a rule, the effect of the torque contribution caused by the braking of gearbox input shaft 1 will be small, which means that, in the exemplary embodiment being described here, compensating for this torque contribution by an appropriate adjustment of the engine torque is not a mandatory measure.

And/or:

It is possible to close clutch 1 only to the extent that the torque which it is able to transmit is sufficient to bring gearbox input shaft 2 to the speed of the engine.

Result:

The entire acceleration method during the operation of the clutch proceeds monotonically without any intermediate decelerations or intermediate accelerations, because it is essentially the torque $M_{Mo0}$ which is being introduced at all times into the gearbox by the gearbox input shafts and transmitted to the gearbox output shaft in correspondence with the gear ratios in the starting and target gears. At the gearbox output shaft, therefore, an essentially constant (Phases I, II, IV, V) or monotonically falling (preferably strictly monotonically, e.g. linearly falling) drive torque (Phase III) is present at all times.

Shifting Sequence: Pull-Mode Downshifting

Assumption: While in pulling mode, a shift is made from a higher gear 1 assigned to gearbox input shaft 1 to a lower gear 2 assigned to gearbox input shaft 2.

In the type of shifting called pull-mode downshifting, the engine is delivering a positive torque to the gearbox. This torque is transmitted via gearbox input shaft 1. Clutch 1 is connected to gearbox input shaft 1, clutch 2 to gearbox input shaft 2. In the starting state, the two clutches are completely closed and are therefore in a state of "overcompression". Both gearbox input shafts are therefore turning at the speed of the engine.

A gear is engaged on gearbox input shaft 1 and thus the flow of force is established between gearbox input shaft 1 and the gearbox output shaft.

Figure 3:
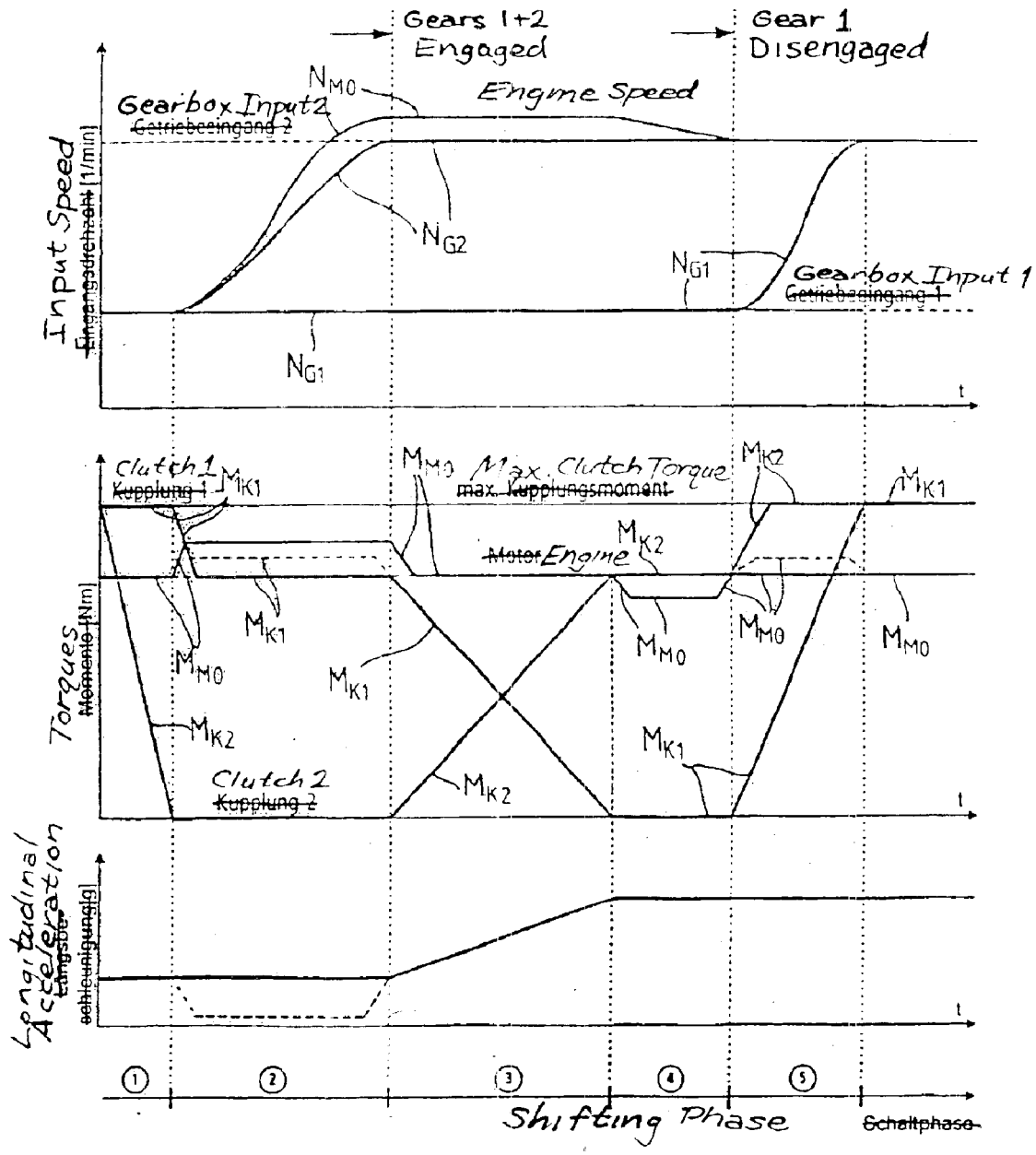
FIG. 3 is a diagram which illustrates one example of a shifting sequence according to the invention for downshifting under pull-mode operating conditions.

A preferred shifting sequence comprising five phases is explained in the following on the basis of FIG. 3. The shifting phases designated by the Arabic numerals 1–5 in FIG. 3 correspond to the following Phases I–V. Possible variants and elaborations of the shifting phases are shown in broken line in FIG. 3 and are explained separately below as "alternatives" to the shifting phase in question. So that the various curves and sections of curves can be differentiated from each other, they are provided with the symbols $N_{Mo}$ for the engine speed, $N_{G1}$ for the speed of gearbox input shaft 1, $N_{G2}$ for the speed of gearbox input shaft 2, $M_{Mo}$ for the engine torque, $M_{K1}$ for the torque of clutch 1, and $M_{K2}$ for the torque of clutch 2. An additional contribution to the change in speed which results from the positive longitudinal acceleration of the vehicle and which represents the change in the vehicle's velocity is not taken into account in the speed sub-diagram. In addition, for the sake of simplicity, it is assumed that the engine torque remains the same in and of itself (without active intervention in engine control) versus the engine speed. The shifting method calculated from the beginning of shifting phase 1 to the end of shifting phase 5 could take, for example, approximately 0.5–1 second.

Phase I:

To initiate the shifting method, clutch 2 is opened completely.

Phase II:

The clutch torque of clutch 1, i.e., $M_{K1}$, is lowered to the engine torque $M_{Mo}$ present in Phase I. In addition, a gear is engaged on gearbox input shaft 2 which is lower than the gear engaged on gearbox input shaft 1. This leads, via the synchronization device of the gearbox, to an increase in the speed of gearbox input shaft 2 to the synchronous speed corresponding to the engaged gear. The engine torque is increased by appropriate intervention in engine management to a value $M_{Mo1}$ which is far enough above the transmittable clutch torque $M_{K1}$ of clutch 1 that the differential torque $M_{slip}=M_{Mo1}-M_{K1}$ causes the engine to turn faster than gearbox input shaft 2.

Phase III:

After the selected engine speed above the speed of gearbox input shaft 2 has been reached, the engine torque is lowered back down to the original torque $M_{Mo0}$ in order to prevent any further increase in engine speed. Clutch 1 is slipping, and the selected slip speed between gearbox input shaft 1 and the engine speed is automatically adjusted under closed-loop control by way of clutch 1. Clutch 2 is closed under open-loop control. As a result, a closed-loop-control opening of clutch 1 is initiated, because the previously selected slip speed can be kept constant only if the sum of the torques $M_{K1}+M_{K2}$, which is transmitted by the two clutches to the gearbox input shaft and thus, via the gearbox, to the gearbox output shaft, is equal to the selected engine torque $M_{Mo0}$:

$$M_{K1}+M_{K2}=M_{Mo0}.$$

Clutch 2 continues to accept more and more engine torque, until clutch 1 is completely open. Clutch 2 can now transmit all of the engine torque $M_{Mo0}$ and is not closed any further.

Phase IV:

Because the engine and thus also the engine-side half of clutch 2 are turning at the speed of gearbox input shaft 2+the slip speed (between gearbox input shaft 2 and the engine), whereas the gearbox-side half of clutch 2 is turning at the speed of gearbox input shaft 2, the engine torque is lowered to $M_{Mo2}$ below the clutch torque $M_{K2}=M_{Mo0}$ to bring the engine speed down to the speed of gearbox input shaft 2.

The braking of the engine brings an additional torque $$M_{RotMot} = 2\pi J_{Mot}\frac{dn}{dt},$$

which comes from the energy $$E_{RotMot} = \frac{1}{2}J_{Mot}\omega^2$$

stored in the flywheel of the engine, to gearbox input shaft 2 and thus to the gearbox output shaft. The total amount of torque applied to the gearbox output shaft corresponds—without consideration of a transmission factor associated with the gear ratio active in the target gear—to the amount of torque which clutch 2 is able to transmit and consists of the following components:

$$M_{Mo1}+M_{RotMot}=M_{Mo0}.$$

Thus, while the engine is being braked, no additional torque is applied to the gearbox output shaft. The gear ratio has not yet been taken into consideration in the torque equation given above, but it enters into it only in the form of a factor. Strictly speaking, $M_{Mo0}$ is the torque transmitted to gearbox input shaft 2, which is equal to the torque transmitted to the gearbox output shaft only at a gear ratio of 1:1.

The completely open clutch 1 now makes it possible for the gear engaged on gearbox input shaft 1 to be disengaged as if there were no torque.

Phase V:

Clutch 2 is completely closed. Clutch 1 is closed, which leads to an increase in the speed n1 of gearbox input shaft 1 to the level of gearbox input shaft 2. The engine torque is returned to the original value $M_{Mo0}$.

Phase I (alternative):

It is possible to close clutch 2 before the beginning of the shifting sequence only to the extent that that the transmitted drag torque is sufficient to keep gearbox input shaft 2 at the speed of the engine. This has no effect on how the engine is controlled at any time during the shifting sequence.

Phase II (alternative):

If the engine torque $M_{Mo0}$ present in Phase I is already equal to the maximum available engine torque $M_{max}$, the engine torque cannot be increased beyond $M_{Mo0}$ by normal intervention in engine management.

To bring the engine speed above the speed of gearbox input shaft 2, the torque beyond $M_{max}$ to be used for this purpose can be delivered by an OVERBOOST function of the engine and/or by an auxiliary unit such as a crankshaft starter-generator.

And/or:

The acceleration energy $$E_{RotG2} = J_{G2}\int_{n1}^{n2}\omega\, dt$$

required to accelerate gearbox input shaft 2 would, in the case of a static engine torque, reduce the torque which the gearbox output shaft is experiencing by $$M_{G2} \propto \frac{d^2}{dt^2}E_{RotG2},$$

which would lead to an undesirable negative intermediate acceleration of the vehicle. To suppress this intermediate acceleration, it is possible to actuate clutch 1 during the synchronization method so that the clutch can transmit a torque corresponding to the sum of the original engine torque $M_{Mo0}$ and the gearbox input shaft torque of gearbox input shaft 2, $M_{G2}$:

$$M_{K1}=M_{Mo0}+M_{G2}.$$

As a rule, the effect produced by the negative torque contribution based on the acceleration of gearbox input shaft 2 will be small, which means that, in the exemplary embodiment discussed here, the compensation of this torque contribution by the appropriate adjustment of clutch 1 is not a mandatory measure.

And/or:

The amount of clutch torque $M_{K1}$ which clutch 1 is able to transmit is decreased in this phase to below the engine torque $M_{Mo0}$ in order to achieve the slip speed required for the closed-loop control of the clutch. To prevent a further increase in the engine speed, the clutch torque $M_{K1}$ is raised to the engine torque $M_{Mo0}$ after the desired engine speed has been reached.

Phase III (alternative):

As an alternative, the differential speed (engine speed–gearbox input shaft speed of gearbox input shaft 2) can be defined as the slip speed and adjusted under closed-loop control by clutch 2. Clutch 1 would then be opened under open-loop control, and clutch 2 would be closed under closed-loop control.

Phase V (alternative):

The acceleration energy $$E_{RotG1} = \frac{1}{2} J_{G1}(\omega_{G1} - \omega_{G2})^2$$

required to increase the speed of gearbox input shaft 1 can be compensated by increasing the engine torque by $$M_{G1} = 2\pi J_{G1} \frac{dn1}{dt}$$

to $M_{Mo3}=M_{Mo0}+M_{G1}$. Then the engine torque is brought back down again to the original level $M_{Mo0}$.

As a rule, the effect produced by the negative torque contribution based on the acceleration of gearbox input shaft 1 will be small, which means that, in the exemplary embodiment described here, the compensation of this torque contribution by an appropriate increase in the engine torque is not a mandatory measure.

And/or:

It is possible to close clutch 1 only to the extent that the torque which it is able to transmit is sufficient to bring gearbox input shaft 2 to the speed of the engine.

Result:

The entire acceleration method during the operation of the clutch proceeds monotonically without any intermediate decelerations or intermediate accelerations, because it is essentially the torque $M_{Mo0}$ which is being introduced at all times into the gearbox by the gearbox input shafts and transmitted to the gearbox output shaft in correspondence with the gear ratios in the starting and target gears. Accordingly, an essentially constant (Phase I, II, IV, V) torque or a monotonically (preferably strictly monotonically, e.g., linearly) rising drive torque (Phase III) is present at all times at the gearbox output shaft.

Shifting Sequence: Push-Mode Upshifting

Assumption: In pushing mode, a shift is made from a lower gear 1 assigned to gearbox input shaft 1 to a higher gear 2 assigned to gearbox input shaft 2.

In the type of shifting called push-mode upshifting, the engine is delivering a drag torque to the gearbox, which is referred to in the following as a "negative torque". Clutch 1 is connected to gearbox input shaft 1, clutch 2 to gearbox input shaft 2. In the starting state, the two clutches are both completely closed and are thus in a state of "overcompression". Both gearbox input shafts are therefore rotating at the speed of the engine. A gear is engaged on gearbox input shaft 1, and thus the flow of force is established between the gearbox input shaft 1 and the gearbox output shaft.

A preferred shifting sequence comprising five shifting phases is explained in the following on the basis of FIG. 4. The shifting phases designated by the Arabic numerals 1–5 in FIG. 2 correspond to the following phases I–V. Possible variants and embodiments of the shifting phases are illustrated in broken line in FIG. 4 and are explained separately below as "alternatives" to the shifting phase in question. So that the various curves and sections of curves can be differentiated, they are provided with the symbols $N_{Mo}$ for the engine speed, $N_{G1}$ for the speed of gearbox input shaft 1, $N_{G2}$ for the speed of gearbox input shaft 2, $M_{Mo}$ for the engine torque, $M_{K1}$ for the torque of clutch 1, and $M_{K2}$ for the torque of clutch 2. The additional contribution to the change in speed which is made by the negative longitudinal acceleration of the vehicle and which represents the change in the vehicle's velocity is not taken into account in the speed sub-diagram. In addition, for the sake of simplicity, it is assumed that the engine torque remains constant in and of itself (without active intervention in engine control) versus the engine speed. The shifting method calculated from the beginning of shifting phase 1 to the end of shifting phase 5 could take, for example, approximately 0.5–1 second.

Phase 1:

To initiate the shifting method, clutch 2 is opened completely.

Phase II:

The transmittable clutch torque $M_{K1}$ is now brought below the current absolute value of the engine torque:

$M_{K1}<|M_{drag}|$.

As a result, the engine speed falls below the speed of the synchronous speed of gearbox input shaft 2. The drag torque transmitted to gearbox input shaft 1 and thus to the gearbox output shaft is now $|M_{K1}|$. A corresponding reduction in the braking action on the vehicle, as shown by way of example in the diagram at the bottom of FIG. 4, is now found in the longitudinal acceleration of the vehicle (negative in pushing mode, therefore also referred to as "longitudinal deceleration"). On gearbox input shaft 2, a gear is engaged which is higher than the gear engaged on gearbox input shaft 1. This leads, by way of the synchronizing device of the gearbox, to a drop in the speed of gearbox input shaft 2 to the synchronous speed corresponding to the engaged gear.

Phase III:

To suppress any further decrease in engine speed, the drag torque of the engine is reduced to $|M_{K1}|$ by appropriate intervention in engine management. Thus clutch 1 is slipping, and a selected slip speed is adjusted under closed-loop control via clutch 1. After the selected slip speed of clutch 1 is reached, clutch 2 is closed under open-loop control. As a result, another closed-loop-controlled opening of clutch 1 is initiated, because the previously selected slip speed can be kept constant only if the sum of the torques $M_{K1}+M_{K2}$ transmitted by the two clutches to the engine remains equal to the absolute value of the drag torque of the engine present in this phase:

$M_{K1}+M_{K2}=|M_{drag}|$.

Clutch 2 continues to accept more and more engine torque until clutch 1 is completely opened.

Phase IV:

The engine drag torque remains on the level of Phase III. The clutch torque of clutch 2, that is, $M_{K2}$, is increased to the absolute value of the maximum engine drag torque $|M_{drag}|$, which leads to an increase in the speed of the engine to the speed of gearbox input shaft 2.

The acceleration energy $$E_{RotMot} = \frac{1}{2} J_{Mot} \omega_{slip}^2$$

of the engine to be expended would lead to a negative intermediate acceleration of the vehicle if the negative engine torque were not kept increased by the absolute value $$M_{RotMot} = 2\pi J_{Mot} \frac{dn}{dt}$$

and the clutch torque of clutch 2 were not kept at $|M_{drag}|$.

Because the negative engine torque remains raised by the amount $$M_{RotMot} = 2\pi J_{Mot}\frac{dn}{dt}$$

and the clutch torque of clutch 2 remains at $|M_{drag}|$, the drag torque:

$$|M_{drag}|=M_{K2}=|M_{Mot}|+|M_{RotMot}|,$$

which is acting on gearbox input shaft 2 and which is transformed on its way to the gearbox output shaft, also remains constant. What results is a corresponding, constant drag torque on the gearbox output shaft or, in general terms, on the vehicle drive. Clutch 1, which is now completely open, makes it possible to disengage the gear which had been engaged on gearbox input shaft 1 as if there were no torque.

Phase V:

The torque of the engine is again brought to the maximum torque value. Clutch 2 is closed. Clutch 1 is closed. This leads to a drop in the speed n1 of gearbox input shaft 1 to the level of gearbox input shaft 2. Thus an additional torque:

$$M_{G1} \propto \frac{d^2}{dt}E_{RotG1}, \left(E_{RotG1} = J_{G1}\int_{n1}^{n2}\omega dt\right)$$

is applied to the gearbox output shaft.

This torque can be compensated by an auxiliary unit, such as by switching a crankshaft starter-generator to generator mode.

Phase I (alternative):

It is possible to close clutch 2 before the start of Phase I of the shifting sequence only to the extent that the transmitted drag torque is sufficient to keep gearbox input shaft 2 at the speed of the engine. This has no effect on the how the engine is controlled at any time during the shifting sequence.

Phase II (alternative):

The engagement of a gear higher than that engaged on gearbox input shaft 1 leads necessarily to a braking of gearbox input shaft 2.

This is associated with a gain in energy $$E_{RotG2} = J_{G2}\int_{n1}^{n2}\omega dt,$$

which applies the additional torque $$M_{G2} \propto \frac{d^2}{dt}E_{RotG2}$$

to the gearbox output shaft. This torque can be compensated by an auxiliary unit, such as by switching a crankshaft starter-generator to generator mode.

And/or:

The drag torque $|M_{K1}|$ being transmitted to the gearbox output shaft at a reduced level because of the opening of clutch 1 can be increased to the original drag torque by an auxiliary unit by, for example, switching a crankshaft starter-generator to generator mode.

And/or:

It is possible that clutch 2 is already open at the beginning of the shifting sequence. This means that transmission input shaft 2 must be accelerated in phase 2. The energy required to do this is drawn from the gearbox output shaft, which leads to an increase in the drag torque at the drive. It is advantageous for this increase in drag torque to be compensated by a reduction in the clutch torque $M_{K1}$ to a value below the maximum engine drag torque $|M_{drag}|$.

Phase III (alternative):

As an alternative, the engine torque can also be increased by means of an auxiliary unit, such as a crankshaft starter-generator.

And/or:

The engine torque is maintained at the level of the maximum drag torque. The clutch torque of clutch 1, that is, $M_{K1}$, is increased to the absolute value of the maximum engine drag torque $|M_{drag}|$ to prevent any further decrease in engine speed. Now, clutch 1 is used to arrive at a slip speed under closed-loop control; clutch 2 is closed under open-loop control; and thus clutch 1 is opened under closed-loop control.

And/or:

As an alternative, the differential speed between the engine speed and the transmission input shaft speed of transmission input shaft 2 can be defined as the slip speed in Phase III and adjusted under closed-loop control by clutch 2. Clutch 1 is then opened under open-loop control, and then clutch 2 is closed under closed-loop control.

Phase IV (alternative):

As an alternative, the engine torque can also be increased by an auxiliary unit such as a crankshaft starter-generator.

And/or:

The engine drag torque is brought back again to the maximum drag torque. Because the engine and thus also the engine-side half of clutch 2 are turning at the speed of (transmission input shaft 2–the slip speed), whereas the transmission-side half of clutch 2 is turning at the speed of transmission input shaft 2, the further open-loop-controlled closing of clutch 2 brings the amount of torque it is able to transmit to a value greater than the engine drag torque, $M_{K2}>|M_{drag}|$, in order to accelerate the engine speed to the speed of transmission input shaft 2.

Phase V (alternative):

It is possible to close clutch 1 only to the extent that the amount of torque which it can transmit is sufficient to bring transmission input shaft 2 to the speed of the engine.

Result:

The entire course of the deceleration method during clutch operation proceeds monotonically without any intermediate decelerations or intermediate accelerations, because an essentially constant (Phase I, IV, V) or a monotonically (preferably strictly monotonically, e.g. linearly) falling drag torque (Phase II, III) is acting on the gearbox output shaft at all times.

Shifting Sequence: Push-Mode Downshifting

Assumption: In a pushing mode, a shift is made from a higher gear 1 assigned to gearbox input shaft 1 to a lower gear 2 assigned to gearbox input shaft 2.

In the type of shifting called push-mode downshifting, the engine is delivering a drag torque to the gearbox, which is referred to in the following as "negative torque". This negative torque is transmitted via gearbox input shaft 1. Clutch 1 is connected to gearbox input shaft 1, clutch 2 to gearbox input shaft 2. In the starting state, the two clutches are completely closed and are thus in a state of "overcompression". The two gearbox input shafts are therefore rotating at the speed of the engine. A gear is engaged on gearbox input shaft 1 and thus the flow of force is established between gearbox input shaft 1 and the gearbox output shaft.

A preferred shifting sequence comprising five shifting phases is explained in the following on the basis of FIG. 5.

Figure 5:
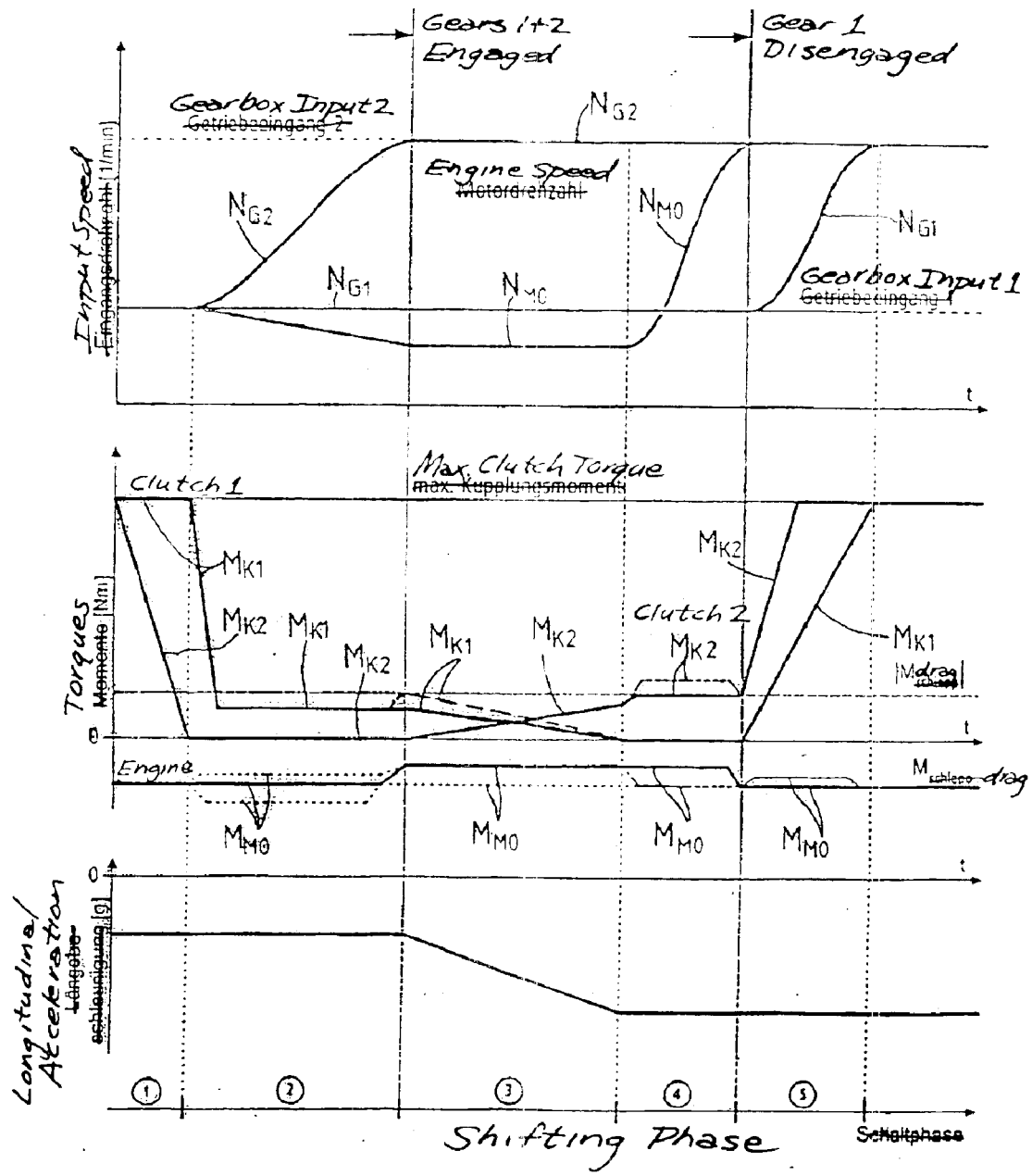
FIG. 5 is a diagram which illustrates one example of a shifting sequence according to the invention for downshifting under push-mode operating conditions.

The shifting phases designated by the Arabic numerals 1–5 in FIG. 5 correspond to the following phases I–V. Possible variants and embodiments of the shifting phases are illustrated in broken line and are explained separately below as "alternatives" to the shifting phase in question. So that the various curves and sections of curves can be differentiated, they are provided with the symbols $N_{Mo}$ for the engine speed, $N_{G1}$ for the speed of gearbox input shaft 1, $N_{G2}$ for the speed of gearbox input shaft 2, $M_{Mo}$ for the engine torque, $M_{K1}$ for the torque of clutch 1, and $M_{K2}$ for the torque of clutch 2. The additional contribution to the change in speed which is made by the negative longitudinal acceleration of the vehicle and which represents the change in the vehicle's velocity is not taken into account in the speed sub-diagram. In addition, for the sake of simplicity, it is assumed that the engine torque remains constant in and of itself (without active intervention in engine control) versus the engine speed. The shifting method calculated from the beginning of shifting phase 1 to the end of shifting phase 5 could take, for example, approximately 0.5–1 second.

Phase I:

To initiate the shifting method, clutch 2 is opened completely.

Phase II:

The torque $M_{K1}$ which clutch 1 can transmit is brought below the current absolute value of the engine torque.

$$M_{K1} < |M_{drag}|.$$

As a result, the engine speed falls below the synchronous speed of transmission input shaft 1. The drag torque transmitted to gearbox input shaft 1 and thus to the gearbox output shaft is now equal to $|M_{K1}|$. The resulting slight reduction in the engine braking effect on the vehicle is comparatively small and either does not appear in the diagram at the bottom of FIG. 5 or is compensated by an appropriate measure. A gear is now engaged on gearbox input shaft 2 which is lower than the gear engaged on gearbox input shaft 1. This leads by way of the synchronizing device of the gearbox to an acceleration of the speed of gearbox input shaft 2 to the synchronous speed corresponding to the engaged gear. For this purpose, the acceleration energy $$E_{RotG2} = J_{G2} \int_{n1}^{n2} \omega dt$$

is required, which would reduce the torque of the gearbox output shaft by $$M_{G2} \propto \frac{d^2}{dt} E_{RotG2}.$$

To ensure that the torque at the gearbox output shaft remains constant, it can be provided that the additional drag torque caused by the acceleration of gearbox input shaft 2 compensates for the decrease in the transmitted drag torque $M_{K1}$ below the maximum engine drag torque $|M_{drag}|$ brought about by the opening of clutch 1.

Phase III:

To prevent any further decrease in the engine speed, the drag torque of the engine is reduced by appropriate intervention in engine management to $|M_{K1}|$. Thus clutch 1 is slipping, and a selected slip speed is reached via clutch 1 under closed-loop control. After the desired slip speed of clutch 1 has been reached, clutch 2 is closed under open-loop control. As a result, another closed-loop-controlled opening of clutch 1 is initiated, because the previously selected slip speed can be kept constant only if the sum of the torques $M_{K1} + M_{K2}$ transmitted by the two clutches to the engine remains equal to the absolute value of the drag torque of the engine:

$$M_{K1} + M_{K2} = |M_{drag}|.$$

Clutch 2 keeps accepting more engine torque until clutch 1 is completely open.

Phase IV:

The engine drag torque remains at the level of Phase III. Because the engine and thus also the engine-side half of clutch 2 is turning at the speed of (gearbox input shaft 1–the slip speed), whereas the gearbox-side half of clutch 2 is turning at the speed of gearbox input shaft 2, clutch 2 is closed further under open-loop control, until its transmittable torque is equal to the absolute value of the drag torque of the engine $M_{K2} = |M_{drag}|$. The engine speed is thus accelerated to the speed of gearbox input shaft 2.

The acceleration energy $$E_{RotMot} = \frac{1}{2} J_{Mot} \omega_{slip}^2$$

of the engine would lead to a negative intermediate acceleration of the vehicle if the negative engine torque were not kept raised by the absolute value $$M_{RotMot} = 2\pi J_{Mot} \frac{dn}{dt}$$

and the clutch torque of clutch 2 were not kept at $|M_{drag}|$.

Because the negative engine torque remains raised by the absolute value $$M_{RotMot} = 2\pi J_{Mot} \frac{dn}{dt}$$

and the clutch torque of clutch 2 remains at $|M_{drag}|$, the drag torque which is acting on gearbox input shaft 2 and which has been transformed on its way to the gearbox output shaft also remains constant:

$$|M_{drag}| = M_{K2} = |M_{Mot}| + |M_{RotMot}|.$$

What results is a corresponding, constant drag torque on the gearbox output shaft or, generally speaking, on the vehicle drive. Clutch 1, which is now completely open, makes it possible for the gear engaged on gearbox input shaft 1 to be disengaged as if there were no torque at all.

Phase V:

The torque of the engine is brought to the maximum drag torque. Clutch 2 is closed. Clutch 1 is closed. This leads to a drop in the speed n1 of gearbox input shaft 1 to the level of gearbox input shaft 2.

Phase I (alternative):

It is possible that, before the start of Phase I of the shifting sequence, clutch 2 is closed only to the extent that the transmitted drag torque is sufficient to keep gearbox input shaft 2 at the speed of the engine. This has no effect at all on how the engine is controlled at any time during the entire shifting sequence.

Phase II (alternative):

The drag torque $|M_{K1}|$, which has been reduced by the opening of clutch 1 and which is being transmitted to the gearbox output shaft, can be increased to the original drag torque by an auxiliary unit, such as by the suitable actuation of a crankshaft starter-generator in generator mode.

And/or:

The negative intermediate acceleration caused by the acceleration of gearbox input shaft 2 can be compensated by an auxiliary unit, such as by the suitable actuation of a crankshaft starter-generator.

Phase III (alternative):

As an alternative, the engine torque can be increased by an auxiliary unit, such as by a crankshaft starter-generator.

And/or:

The engine torque is held at the level of the maximum drag torque. The clutch torque of clutch 1, $M_{K1}$, is increased to the absolute value of the maximum engine torque $|M_{drag}|$ in order to prevent any further decrease in engine speed. Now a slip speed is adjusted under closed-loop control; clutch 2 is closed under open-loop control; and thus clutch 1 is opened under closed-loop control.

And/or:

As an alternative, the differential speed (engine speed–gearbox input shaft speed of gearbox input shaft 2) can be defined in Phase III as the slip speed and adjusted by the closed-loop control of clutch 2. Clutch 1 is then opened under open-loop control, and after that clutch 2 is closed under closed-loop control.

Phase IV (alternative):

As an alternative, the engine torque can also be increased by means of an auxiliary unit such as a crankshaft starter-generator.

And/or:

The engine drag torque is brought back to the maximum drag torque. Because the engine and thus also the engine-side half of clutch 2 are turning at the speed of (gearbox input shaft 2–the slip speed), whereas the gearbox-side half of clutch 2 is turning at the speed of gearbox input shaft 2, clutch 2 is closed further under open-loop control to increase its transmittable torque above the engine drag torque, $M_{K2}>|M_{drag}|$ in order to accelerate the engine speed to the speed of gearbox input shaft 2. Shortly before the synchronous speed is reached, the clutch torque of clutch 2 is reduced to $M_{K2}=|M_{drag}|$.

Phase V (alternative):

Clutch 1 is closed. This leads to an increase in the speed n1 of gearbox input shaft 1 to the level of transmission input shaft 2. To accelerate gearbox input shaft 1, the acceleration energy $$E_{RotG1} = J_{G1} \int_{n1}^{n2} \omega dt$$

is required. To avoid a negative intermediate acceleration method of the vehicle, the negative engine torque is increased by the absolute value $$M_{G1} \propto \frac{d^2}{dt} E_{RotG1},$$

so that the drag torque at the vehicle's drive remains constant.

And/or:

It is possible to close clutch 1 only to the extent that the torque which it is able to transmit is sufficient to bring gearbox input shaft 2 to the speed of the engine.

Result:

The entire course of the deceleration method during clutch operation proceeds monotonically without any intermediate decelerations or intermediate accelerations, because an essentially constant (Phase I, II, IV, V) or a monotonically (preferably strictly monotonically, e.g., linearly) falling drag torque (Phase III) is acting on the gearbox output shaft at all times.

Figure 6:
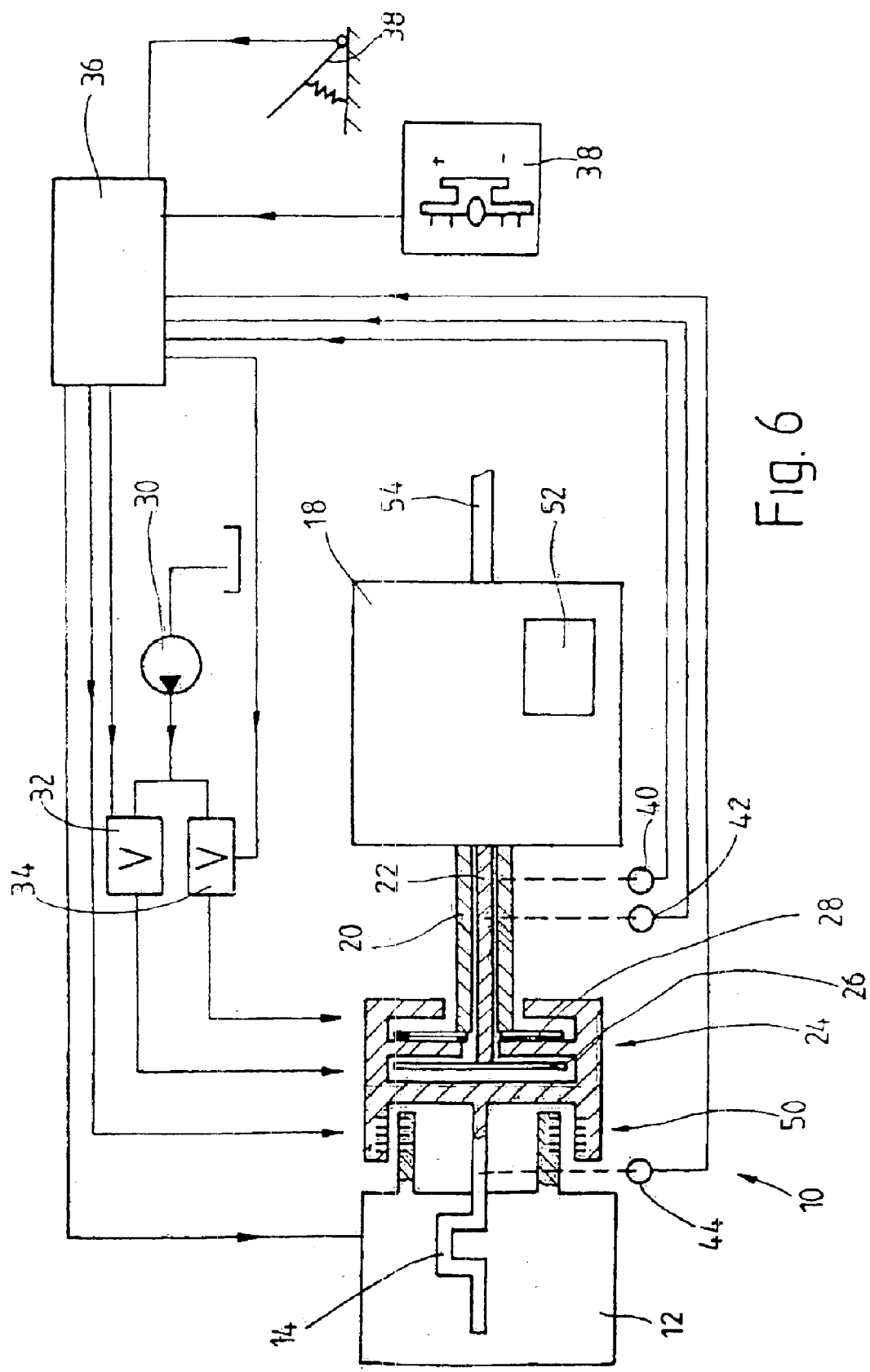
FIG. 6 shows a schematic diagram of a modification of the drive train according to FIG. 1, according to which a dry-running double clutch of the friction-disk type is provided instead of a wet-running disk-type double clutch.

FIG. 6 shows another example of a drive train 10 of a motor vehicle. Only the changes in comparison with the drive train according to FIG. 1 will be explained. Instead of a double clutch 24 with two wet-running disk clutch arrangements 26, 28, the example of FIG. 6 comprises a double clutch 24 with two dry-running clutch arrangements 26, 28 of the friction disk type. The two friction disk clutch arrangements can be actuated hydraulically, for example, by means of hydraulic slave cylinders integrated into the double clutch, which is assumed in FIG. 6. Corresponding possibilities of realization can be derived from DE 35 26 630 A1, for example, but it is also possible to use dry-running clutches of a completely different design, for which reference can be made by way of example to EP 0 931 951 A1.

Additional exemplary shifting sequences which realize execution variants of an operating method according to the invention for a drive train such as the drive train of FIG. 1 or FIG. 6 are explained in the following with reference to FIGS. 7–9 (compare also FIGS. 10 and 15). The shifting sequences can be realized, for example, with the help of the control unit 36 by means of appropriate actuation of the drive unit 12, of the clutch arrangements 26 and 28, and—insofar as helpful—of the auxiliary unit 50, possibly as a function of parameters specified by the unit 38. The shifting sequences are preferably performed in a fully automated manner by the control unit 36.

In the following explanations, the focus of which is on the differences between the current sequences and those according to FIGS. 2–5 (it being assumed to this extent that these shifting sequences are known and understood), reference is again made to gearbox input shafts 1 and 2, to clutches 1 and 2, and to gears 1 and 2. Gearbox input shaft 1 can correspond to shaft 20 and gearbox input shaft 2 can correspond to shaft 22 or vice versa. Accordingly, clutch 1 can correspond to clutch arrangement 26, and clutch 2 can correspond to clutch arrangement 28 or vice versa. Gear 1 is a gear (the starting gear) assigned to gearbox input shaft 1, and gear 2 is a gear (the target gear) assigned to gearbox input shaft 2.

Figure 7:
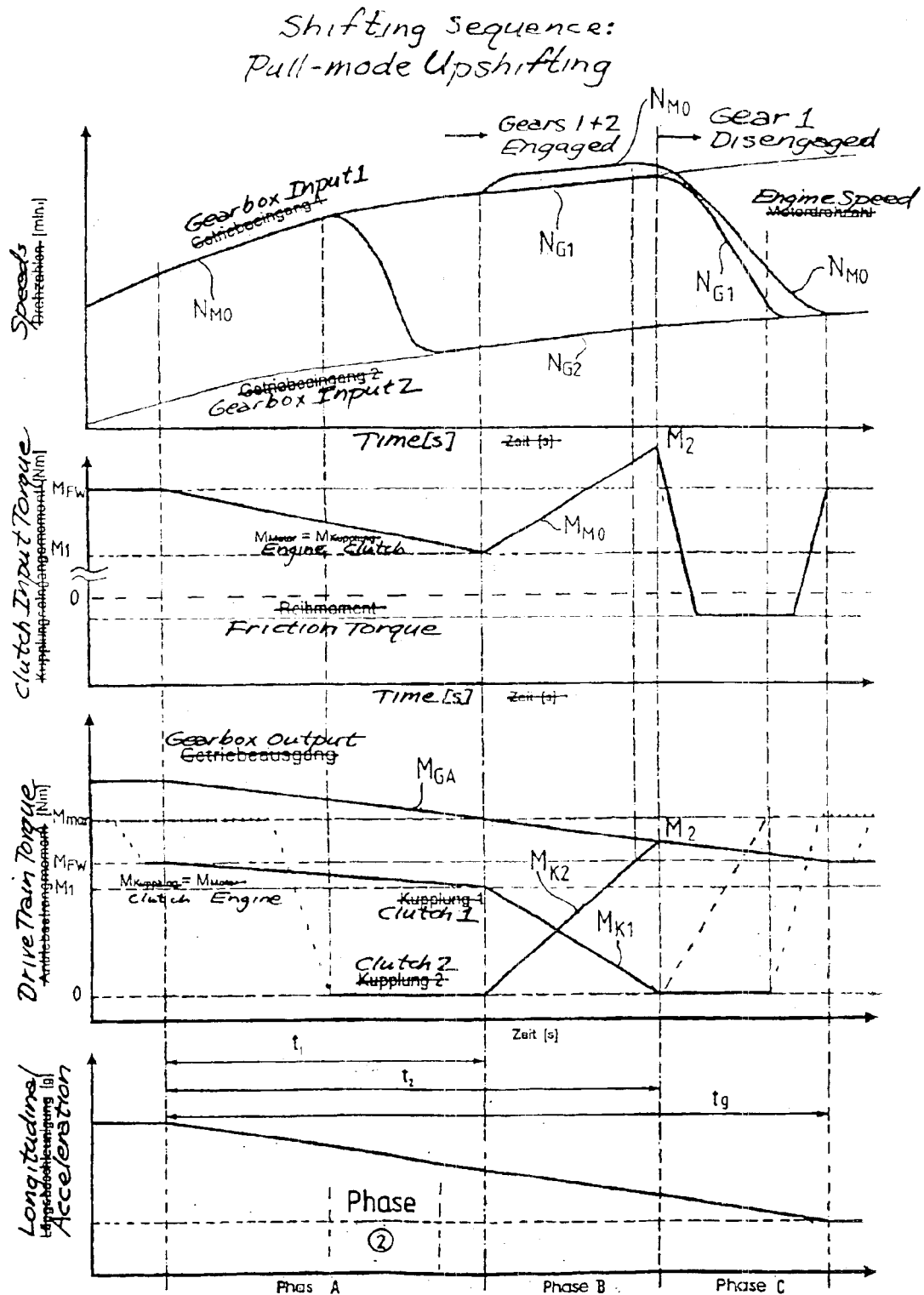
FIG. 7 is a diagram which illustrates another example of a shifting sequence according to the invention for upshifting under pull-mode operating conditions.

FIG. 7 shows an example of a shifting sequence according to the invention, in which the friction work in the clutch arrangements produced during the crossover shifting phase is reduced, but in which nevertheless a "soft" acceleration transfer is ensured. The inventive shifting sequence according to the exemplary embodiment discussed here is characterized by a comparatively long (e.g., 700 ms) transition phase, during which the longitudinal acceleration of the vehicle decreases in a strictly monotonic manner; in the present case, it decreases linearly and continuously. This transition phase is formed in the exemplary embodiment by the sub-phases A, B, and C, of which sub-phase B is the crossover shifting phase in which the two clutch arrangements are actuated in opposite directions in order to reallocate the torque from the one to the other gearbox input shaft. As in the case of exemplary embodiments of FIGS. 2–6, it is assumed in this and in the following exemplary embodiments that the starting gear is gear 1 (to which gearbox input shaft 1 and clutch arrangement 1 are assigned), and that the target gear is gear 2 (to which gearbox input shaft 2 and clutch arrangement 2 are assigned).

Crossover shifting phase B can be, for example, approximately 100–150 ms long. Phase A is the "gradient phase" which precedes crossover shifting phase B and which can be, for example, 400–500 ms long. Crossover shifting phase B is followed by phase C, also called a "gradient phase", which can be, for example, 100–150 ms long.

Figure 2:
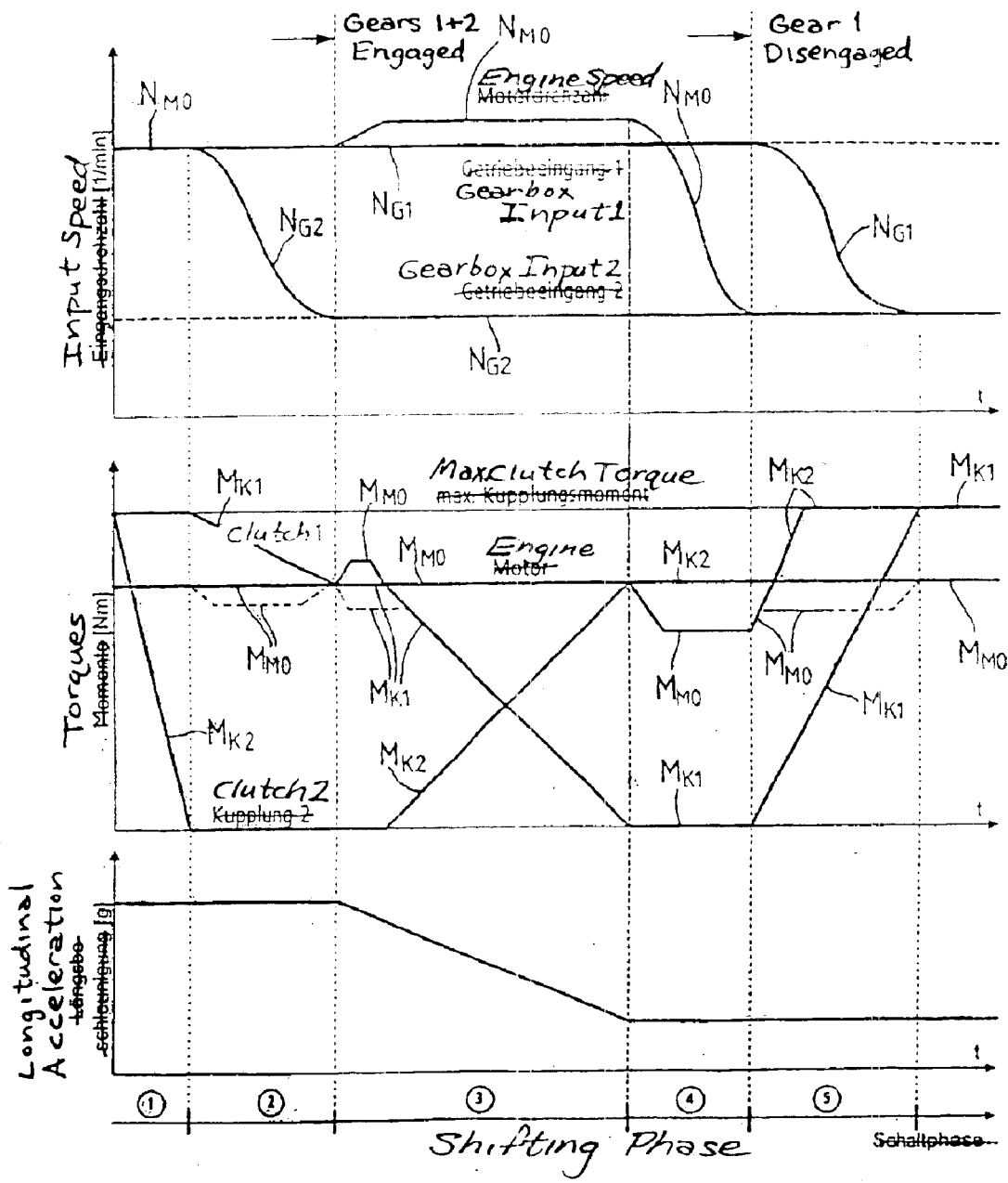
FIG. 2 is a diagram which illustrates one example of a shifting sequence according to the invention for upshifting under pull-mode operating conditions.

During gradient phase A, a sub-phase II occurs (characterized in the figure by the corresponding Arabic numeral 2), during which the target gear 2 is actuated in the engaging direction, so that, by the action of the synchronizing device of the gearbox, gearbox input shaft 2 is brought to a speed corresponding to the instantaneous speed of the gearbox output shaft, so that, at the end of this sub-phase II, which to this extent corresponds to phase II of FIG. 2, the gear is engaged.

A reduction in the friction work occurring in the clutch arrangements results primarily from the shortening of crossover shifting phase B in comparison with the length of the driving comfort-determining transition phase as a whole, during which the longitudinal acceleration changes. It is during the crossover shifting phase that the clutch arrangements are subjected to severe loads as a result of slip.

According to the exemplary embodiment, the torque delivered by the engine is reduced in a strictly monotonic manner (linear in the present case), namely, to the torque value $M_1$ by the end of phase A, by intervention in engine management. In synchrony with this, clutch arrangement 1 is actuated slightly in the disengaging direction, so that the torque which can be transmitted by clutch arrangement 1 is essentially the same as the engine torque. This can be achieved, for example, by so-called "automatic microslip control", in which a so-called "microslip" (e.g., 10–50 rpm) is automatically adjusted by means of the clutch arrangement. Thus, the torque which can be (and which is actually) transmitted by clutch arrangement 1 has fallen to the value $M_1$ by the end of phase A. But it is also possible in principle to separate the actuation of the clutch arrangement from the change in engine torque. The key point here is that, during phase A, the drive torque transmitted by clutch arrangement 1 to gearbox input shaft 1 decreases in correspondence with the desired change in the longitudinal acceleration, and it is irrelevant whether this is achieved by an appropriate change in the engine torque and/or by an appropriate change in the state of engagement of clutch arrangement 1. For example, the engine torque could be reduced in the manner shown in the diagram second from the top in FIG. 7, and clutch arrangement 1 could be left completely engaged throughout phase A. This clutch arrangement would then not be actuated in the disengaging direction until the end of phase A, so that the torque which this clutch arrangement can transmit approaches the engine torque present at the end of phase A. The actuation of clutch arrangement 1 shown in FIG. 7 appears to be especially advantageous, however, because it opens up the possibility of simple automatic microslip control.

Because the clutch torque has already been brought down to the value $M_1$ at the beginning of crossover shifting phase B, the result is a further reduction in the total amount of friction work resulting from clutch slip in phase B for clutch arrangement 1, because the friction power occurring at the clutch arrangement is proportional to the transmitted torque (friction power=transmitted torque×slip speed). At the beginning of crossover shifting phase B, therefore, the torque acting at clutch arrangement 1 has already been lowered, which results in a corresponding reduction in the friction work per unit time over the course of phase B.

During the course of crossover shifting phase B, the engine torque $M_{Mo}$ is then increased again, namely, to a value $M_2$, which is above the torque $M_{FW}$ (torque desired by the driver) prevailing before the beginning of the shifting sequence. As a result, the drive torque $M_{GA}$ present at the gearbox output shaft at the end of phase B is still greater than the drive torque corresponding to the torque desired by the driver under consideration of the torque transformation resulting from the change in the gear ratio. The change in the longitudinal acceleration is therefore not yet completed; on the contrary, it can also be extended over gradient phase C by actuating clutch arrangement 2 again so as to disengage it slightly. The torque which can be transmitted by clutch arrangement 2 (and thus the torque actually transmitted by this clutch arrangement) thus falls from the value $M_2$ at the beginning of phase C to the driver's desired torque $M_{FW}$ at the end of phase C, as a result of which the change in the longitudinal acceleration is completed, which, with respect to the difference between the longitudinal acceleration before and after the shifting sequence, corresponds to the change in the longitudinal acceleration resulting from the change in the gear ratio upon transfer of a constant drive torque from gearbox input shaft 1 to gearbox input shaft 2. The vehicle occupants therefore experience inertial forces like those which would have occurred if the crossover shifting phase had been extended over the entire transition phase A+B+C. The comfort of the ride is therefore the same as if the crossover shifting phase had been relatively long, but there is no need to accept a correspondingly large amount of frictional load on the clutch arrangements as a result of slippage. It should be pointed out that, at the end of phase B, the amount of friction work per unit time is slightly higher for clutch arrangement 2, because the clutch torque is raised beyond the driver's desired torque to the value $M_2$. This effect, however, is minor in comparison to the shortening of the crossover shifting phase B with respect to the transition phase as a whole. Overall, as a result of the decrease in the duration of the crossover shifting phase, a significant reduction in the friction work can be achieved for both clutch arrangements.

With respect to the diagram second from the top in FIG. 7, it should also be explained that the engine torque is reduced in phase C in order to "use up" the clutch slippage in clutch arrangement 2 and therefore to draw the engine speed down to the speed of gearbox input shaft 2. Because the torque transmitted in phase C is limited at the top by the amount of torque which clutch arrangement 2 is able to transmit and because energy stored in the flywheel of the engine is drawn upon as the engine torque is decreased and the engine is braked correspondingly, the exact course of the reduction in engine torque in phase C is not critical. It is recommended, however, that the clutch slippage be "used up" as soon as possible, so that the friction work still occurring in phase C in clutch arrangement 2 can be minimized. According to the exemplary embodiment, therefore, the engine drive is completely disconnected, so that the negative engine friction torque (engine drag torque) can exert its effect, and accordingly the clutch slip is used up quickly.

Shortly before the engine speed is matched to the speed of gearbox input shaft 2, the engine torque is increased again in such a way that, after the slip has been used up, the engine torque is equal to the nominal engine torque $M_{FW}$. Thereafter, clutch arrangement 2 can be completely engaged, because now the torque to be called up from the engine exerts a limiting effect. If we ignore the contribution made by the braking of gearbox input shaft 1 when clutch arrangement 1 is engaged, it is irrelevant in principle when clutch arrangement 1 is engaged again (to the extent that this is desirable at all).

With respect to the diagram of FIG. 7, it should also be pointed out that the sections of curves shown in broken line are merely examples, and that the curves in these time ranges could, in principle, take any desired course. With respect to the diagram third from the top, it should also be mentioned that it is not the actual gearbox output torque $M_{GA}$ which is shown, but rather the gearbox output torque after its transformation to the gearbox input side in correspondence with the ratio of the gear train assigned to clutch arrangement 2. If the actual gearbox output torque were in fact plotted in the diagram, the torque transmitted by clutch arrangement 2 at the end of phase B could not be equal to the gearbox output torque unless the gear ratio were 1:1 in gear 2. In the case of a ratio not equal to 1:1, the same graphic transformation with respect to the gearbox output torque is to be assumed for all three phases A, B, and C, that is, for phases A and B as well, in which clutch arrangement 1 and gear 1 are working.

To reduce the friction work in the clutch arrangements as much as possible, it is recommended that the phases or time segments of the shifting sequence in which no clutch slip or at most minimal slip or perhaps only "microslip" occurs be stretched out in time as long as possible. For example, phase A could be made especially long. It would then be possible to eliminate phase C.

If it is desired to eliminate phase C, one could also increase the clutch torque for clutch arrangement 2 to the nominal value $M_{FW}$ in phase B. In this case, the engine torque in phase B will be increased to a correspondingly lesser degree, perhaps to the value $M_{FW}$ by the end of phase B.

A shifting sequence according to the invention such as that shown in FIG. 7 can be implemented as follows by way of example. Phase A begins with the signaling of the desire to shift (possibly automated on the basis of characteristic shifting curves or by way of a manually actuated switch). After the desire to shift has been signaled, a desired acceleration gradient is calculated, by means of which the starting acceleration level is to be increased to the target acceleration level. The starting and ending times of the individual subphases (phases A, B, and C) can then be determined on the basis of these gradients. These times then determine the necessary reduction in torque (in the example here, the decrease in engine torque) which must occur in phase A, beginning with the reduction from the driver's desired torque $M_{FW}$ to the value $M_1$. In the exemplary embodiment, this reduction is achieved by appropriate intervention in engine management.

The absolute value of the torque reduction depends on the jump between the ratio of the starting gear and that of the target gear, and the fraction of this torque reduction to be accomplished during phase A depends on the duration $t_1$ of phase A. If we assume a linear reduction in torque, the torque value $M_1$ at the end of phase A is calculated as follows:

$$M_1 = M_{FW} \times (1 - (1 - i_Z/i_A) \times t_1/t_g),$$

where $i_A$, $i_Z$, and $t_g$ are the gear ratios in the starting gear ($i_A$) and in the target gear ($i_Z$) and the total duration $t_g$ of the transition phase A+B+C (x=the multiplication operator). This formula can be derived easily on the basis of the linear equation and the assumption that the acceleration of the vehicle corresponds to the product of the gearbox input torque times the gear ratio.

Now that, in phase A, the clutch arrangement of the starting gear has been engaged and the clutch of the target gear has been opened or is being opened, phase B is characterized by the transfer of torque from clutch arrangement 1 to clutch arrangement 2. According to the exemplary embodiment, the engine is adjusted in this phase to a speed which is higher than the speeds of the two gearbox input shafts, so that the clutch arrangements can now be actuated, one under open-loop control, the other under closed-loop control on the basis of clutch slip. For example, clutch arrangement 1 is opened under open-loop control, and clutch arrangement 2 is closed under closed-loop control.

In the exemplary embodiment, the target value $M_2$ of the clutch torque of clutch arrangement 2 is above the driver's desired torque $M_{FW}$. Under the assumption of a linear change, the value $M_2$ can be calculated as follows:

$$M_2 = M_{FW} \times (1 - (1 - i_Z/i_A) \times t_2/t_g) \times i_A/i_Z,$$

where $t_2$ is the total duration of phase A plus phase B and therefore determines the time at which phase B ends.

Phase C in the exemplary embodiment is determined by the method of bringing of the engine speed from, for example, the level of gearbox input shaft speed 1 to the level of gearbox input shaft speed 2. As discussed, the engine torque can for this purpose be reduced maximally to the engine friction torque. The clutch torque is reduced from torque $M_2$ to the torque corresponding to that desired by the driver. After the speeds of the engine and of gearbox input shaft 2 have become equal, clutch arrangement 2 can be completely closed. Clutch arrangement 1 can be immediately closed again after gear 1 has been disengaged or at a later time in order to bring the speed of gearbox input shaft 1 to the same speed as that of gearbox input shaft 2. In the diagram at the top of FIG. 7, it is assumed that clutch arrangement 1 is closed as soon as gear 1 has been disengaged. In the diagram third from the top, two different possibilities for the closing of clutch arrangement 1 are shown in broken line. It is also possible, however, to keep clutch arrangement 1 open, depending on the shifting concept being realized.

With respect to the speed curves in FIG. 7, it should also be pointed out that, in contrast to the diagrams according to FIGS. 2–5, the increase in the rotational speeds corresponding to the vehicle's instantaneous acceleration has been taken into consideration.

Figure 8:
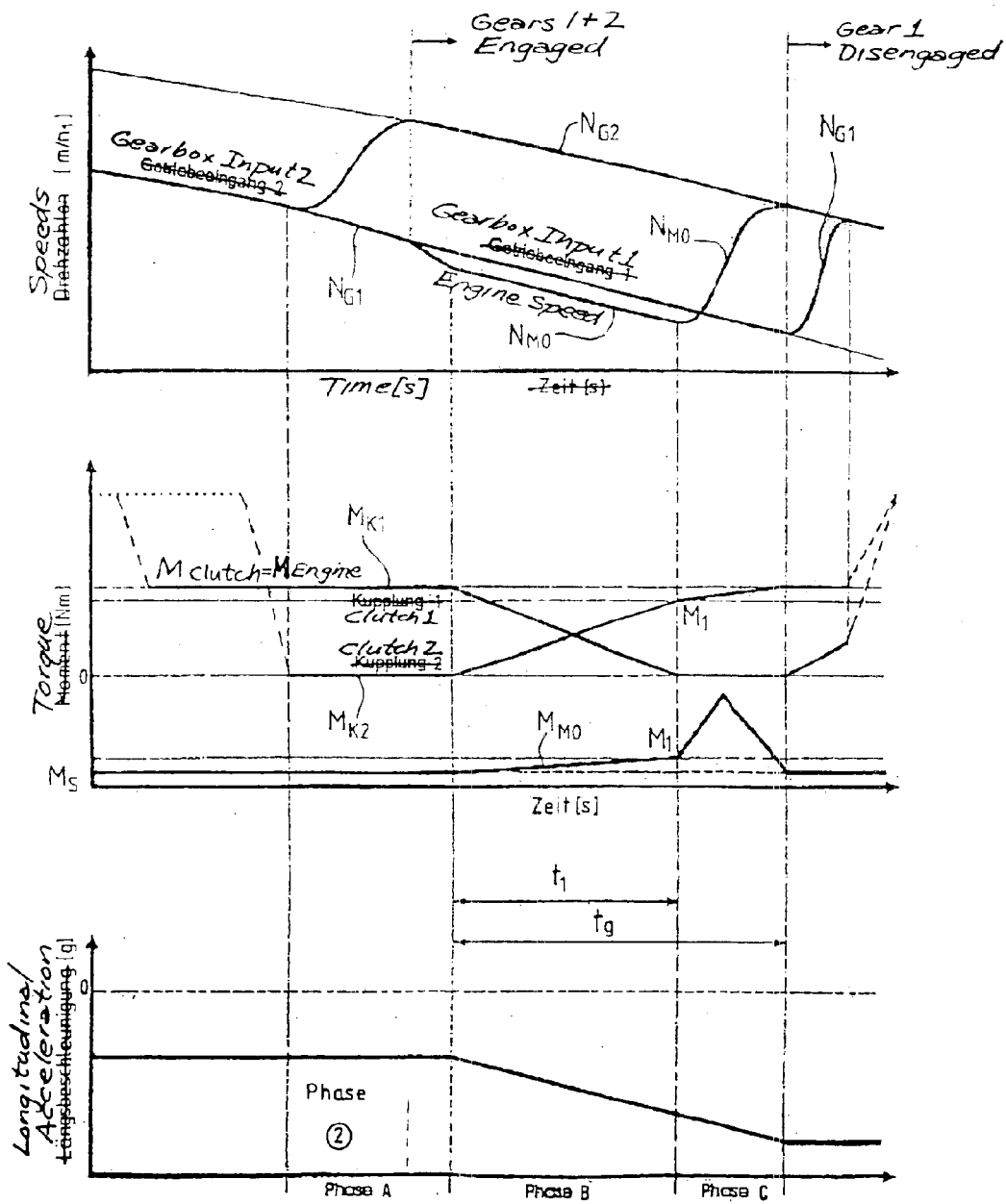
FIG. 8 is a diagram which illustrates another example of a shifting sequence according to the invention for downshifting under push-mode operating conditions.

FIG. 8 shows an exemplary embodiment of a shifting sequence according to the invention for the case of downshifting under push-mode conditions. It is again assumed that the starting gear (the higher gear) is referred to as "gear 1" and that the target gear (the lower gear) is referred to as "gear 2". In the exemplary embodiment, the "transition phase" is formed by phases B and C; phase B constitutes the crossover shifting phase. Proceeding from a state in which a drag torque $M_S$, possibly the friction torque according to FIG. 7, is being applied by the engine, the engine drag torque is reduced to a drag torque value $M_1$—linearly in the example discussed here—by appropriate intervention in engine management (by "giving gas" to the necessary extent) during phase B. Clutch arrangement 2 is engaged in phase B to such an extent that the torque which it can transmit is approximately the same as the drag torque $M_1$. Thus, at the end of phase B, the drag torque acting on the gearbox power takeoff is greater than that which would result from a gearbox input-side-drag torque $M_S$ on gearbox input shaft 2 and from the effect of the gear ratio active in gear 2. Thus the deceleration of the vehicle (negative longitudinal acceleration) has not yet reached its end value at the end of phase B; on the contrary, it does not reach its end point (with a larger absolute value) until phase C, being guided there in linear fashion by the appropriate actuation of clutch arrangement 2. What results is a corresponding increase in the length of the transition phase in comparison to the crossover shifting phase, such as to a value $t_g$=500–700 ms (versus, for example, a value $t_1$ of 300–500 ms for crossover shifting phase B).

In phase C, the engine drag torque is first reduced relatively sharply at first by appropriate intervention in engine management in order to bring the engine speed to the speed of gearbox input shaft 2 and thus to use up the slip of clutch arrangement 2. Then the engine drag torque is returned to the starting value $M_S$. Clutch arrangement 2 is gradually closed during this period in such a way that its transmittable torque corresponds to the desired longitudinal acceleration in phase C.

It would also be possible, for example, to include a phase A (comprising sub-phase II, in which target gear 2 is engaged after appropriate synchronization of the speeds) in the transition phase, preceding phase B. This could be done, for example, by the use of an auxiliary unit (such as the crankshaft starter-generator 50 according to FIGS. 1–6 or the vehicle's brake system) to produce an appropriate negative torque, that is, an appropriate additional drag torque.

Figure 9:
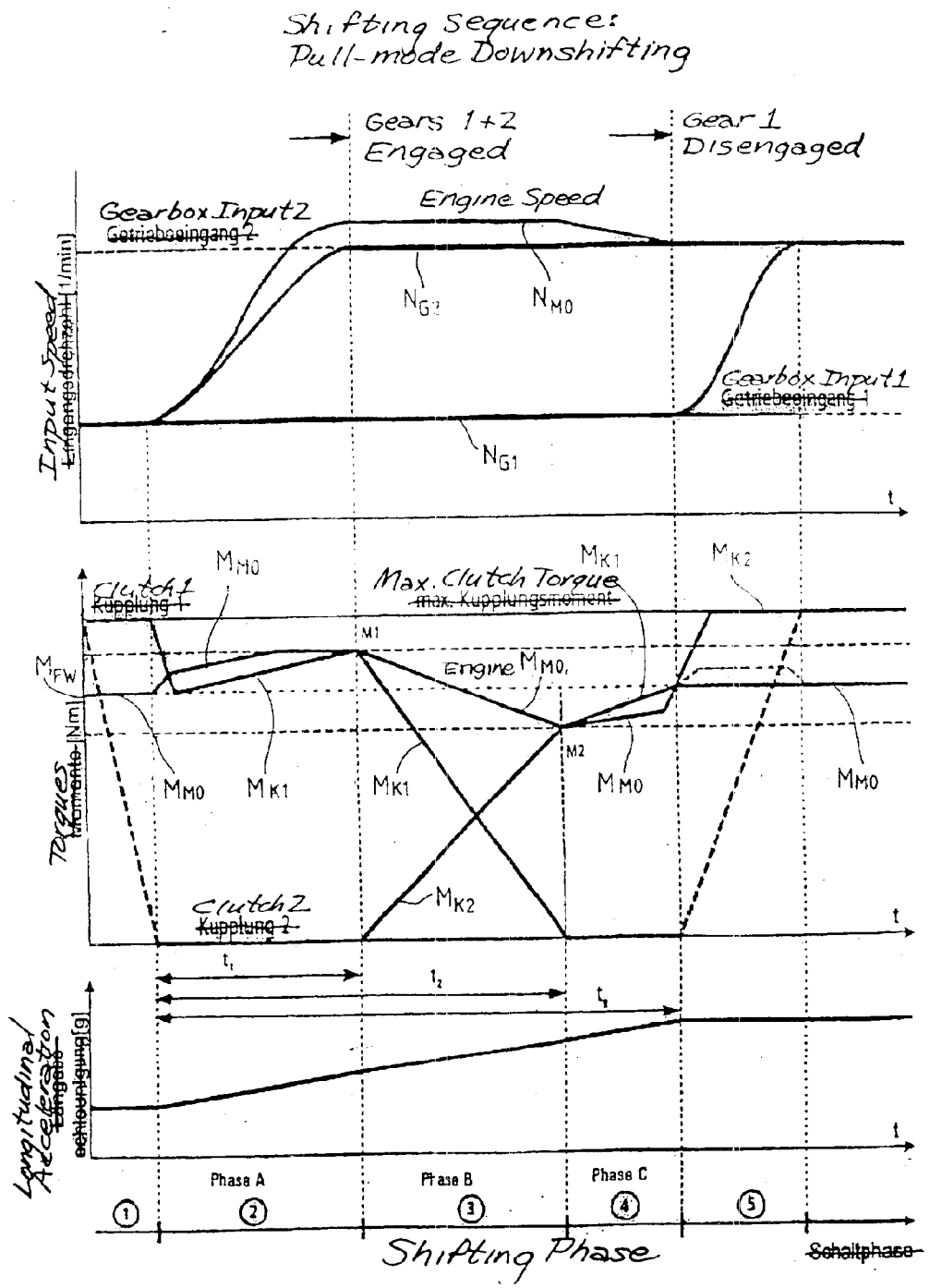
FIG. 9 is a diagram which illustrates another example of a shifting equation according to the invention for downshifting under pull-mode operating conditions.

FIG. 9 shows an example of a shifting sequence according to the invention for the case of pull-mode downshifting, that is, for downshifting under pull-mode operating conditions. It is again assumed that the starting gear (the higher gear) is "gear 1" and that the target gear (the lower gear) is "gear 2". The diagrams in FIG. 9 are presented in the same way as the diagrams of FIG. 3. That is, the change in the rotational speeds resulting from the effective acceleration of the vehicle is not taken into consideration, and phases I–V of the shifting sequence of FIG. 3 are indicated. In FIG. 9, Arabic numerals corresponding to the Roman numerals of the shifting phases are shown in circles as in FIG. 3.

Phase III is to be identified as the crossover shifting phase or phase B in accordance with the preceding examples shown in FIGS. 7 and 8. In addition to the crossover shifting phase III, the transition phase also comprises the preceding phase II (=phase A) and the following phase IV (=phase C).

An acceleration gradient can be obtained as early as phase A as follows. After the clutch has started slipping, the clutch torque of clutch arrangement 1 is lowered to the starting value of the engine torque $M_{FW}$, and the engine torque $M_{Mo}$ is raised above this value. As a result, the clutch torque $M_{K1}$ is increased in linear fashion in correspondence with the desired gradient to the value $M_1$, in phase A, accompanied by a simultaneous further increase in the engine torque $M_{MO}$, so that the engine torque is always greater than the clutch torque. For example, the difference between these two torques is adjusted in such a way that the engine speed increases to a predetermined level above the new synchronous speed resulting from the engagement of gear 2.

It should be remarked that this sequence is possible only in cases where the vehicle was not being driven with maximum torque beforehand or only in cases where, while the vehicle was being driven with maximum torque, additional torque can be delivered by an auxiliary unit (such as the crankshaft starter-generator). Before the shifting sequence is begun, therefore, it must be determined whether this shifting sequence is possible at all. If this is not the case or if, for example, a "sports car mode" is selected, according to which a faster and less comfortable change in longitudinal acceleration is desired, it is possible for example, to use the shifting sequence of FIG. 3, in which case the duration of the crossover shifting phase can be reduced correspondingly to reduce the frictional load on the clutch arrangement during this phase. Other variations or combinations based on the shifting sequence according to FIG. 9 and the shifting sequence according to FIG. 3 can also be imagined. For example, while maximum torque is being applied, the change in longitudinal acceleration can be distributed over phases 3 and 4, as a result of which little or no reduction in the friction work is achieved but a more comfortable ride is obtained even in the above-mentioned "sports car mode".

In phase III, that is, during crossover shifting phase B, the engine torque is lowered to the value $M_2$, which is below the nominal value $M_{FW}$ at the end of the transition phase, which means that the final value of the longitudinal acceleration has not yet been reached. In phase III, clutch arrangement 2 is adjusted under open-loop or closed-loop control in such a way that its transmittable torque also arrives at the value $M_2$ by the end of phase III. If clutch arrangement 1 is opened under open-loop control and clutch arrangement 2 is closed under closed-loop control, the transmittable torque of clutch arrangement 2 increases automatically to the value $M_2$ by the end of phase III.

In phase IV (phase C), the clutch torque of clutch arrangement 2 is then increased to a value corresponding to the original engine torque (corresponding, therefore, to the nominal engine torque $M_{FW}$). The engine torque in phase IV is below the clutch torque and is adjusted under open-loop control back to the original torque $M_{FW}$ only at the end of phase IV, with the result that the engine speed becomes the same as that of gearbox input shaft 2. After that, the engine torque in phase V remains at the value $M_{FW}$, and clutch arrangement 2 can be completely disengaged.

Figure 10:
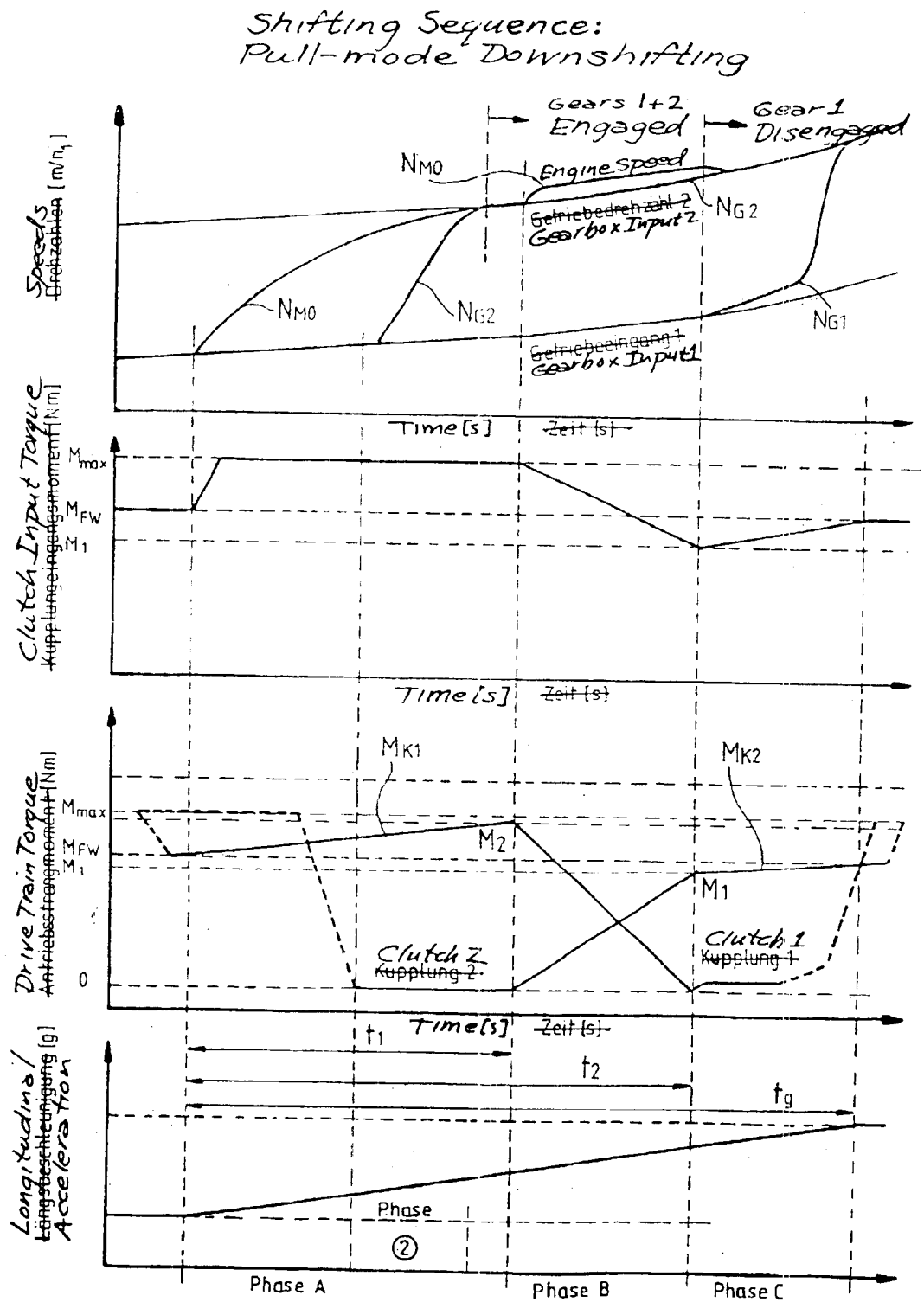
FIG. 10 is a diagram which illustrates another example of a shifting sequence according to the invention for downshifting under pull-mode operating conditions.

Another example of pull-mode downshifting according to the invention is shown in FIG. 10. The example is presented in a manner similar to that used for the examples of FIGS. 7 and 8: the change in the rotational speeds resulting from the associated vehicle acceleration is therefore taken into consideration.

According to the example of FIG. 10, the engine torque is raised quickly at the beginning of gradient phase A from the driver's desired torque $M_{FW}$ to the maximum engine torque $M_{max}$ in order to bring the engine speed to the target speed as quickly as possible. In return, it is necessary to tolerate a corresponding slip in clutch arrangement 1. The degree of engagement of clutch arrangement 1 is increased gradually from a state in which the transmittable torque is equal to $M_{FW}$, to a state in which the transmittable torque corresponds to the instantaneous value $M_2$ at the end of phase A, this being accompanied by a corresponding change in the longitudinal acceleration. Target gear 2 is engaged over the course of a sub-phase of phase A, which can be identified as "phase II" according to the previously discussed exemplary embodiments. As a result, the speed of gearbox input shaft 2 increases, and gear 2 is engaged by the end of this sub-phase II. Crossover shifting phase B is essentially the same as crossover shifting phase B of the example in FIG. 9. Therefore, the engine torque is decreased to a value below the driver's desired torque $M_{FW}$, and simultaneously the two clutch arrangements are actuated in opposite directions. The drive torque at the gearbox output shaft and accordingly the longitudinal acceleration of the vehicle have still not reached their final values by the end of phase B. Thus, in gradient phase B, the engine torque is increased to the value $M_{FW}$ under appropriate actuation of clutch arrangement 2 to increase the torque at the gearbox output shaft and thus the longitudinal acceleration to the values which correspond to the ratio in target gear 2 associated with the driver's desired torque $M_{FW}$ present at the gearbox input.

Figure 4:
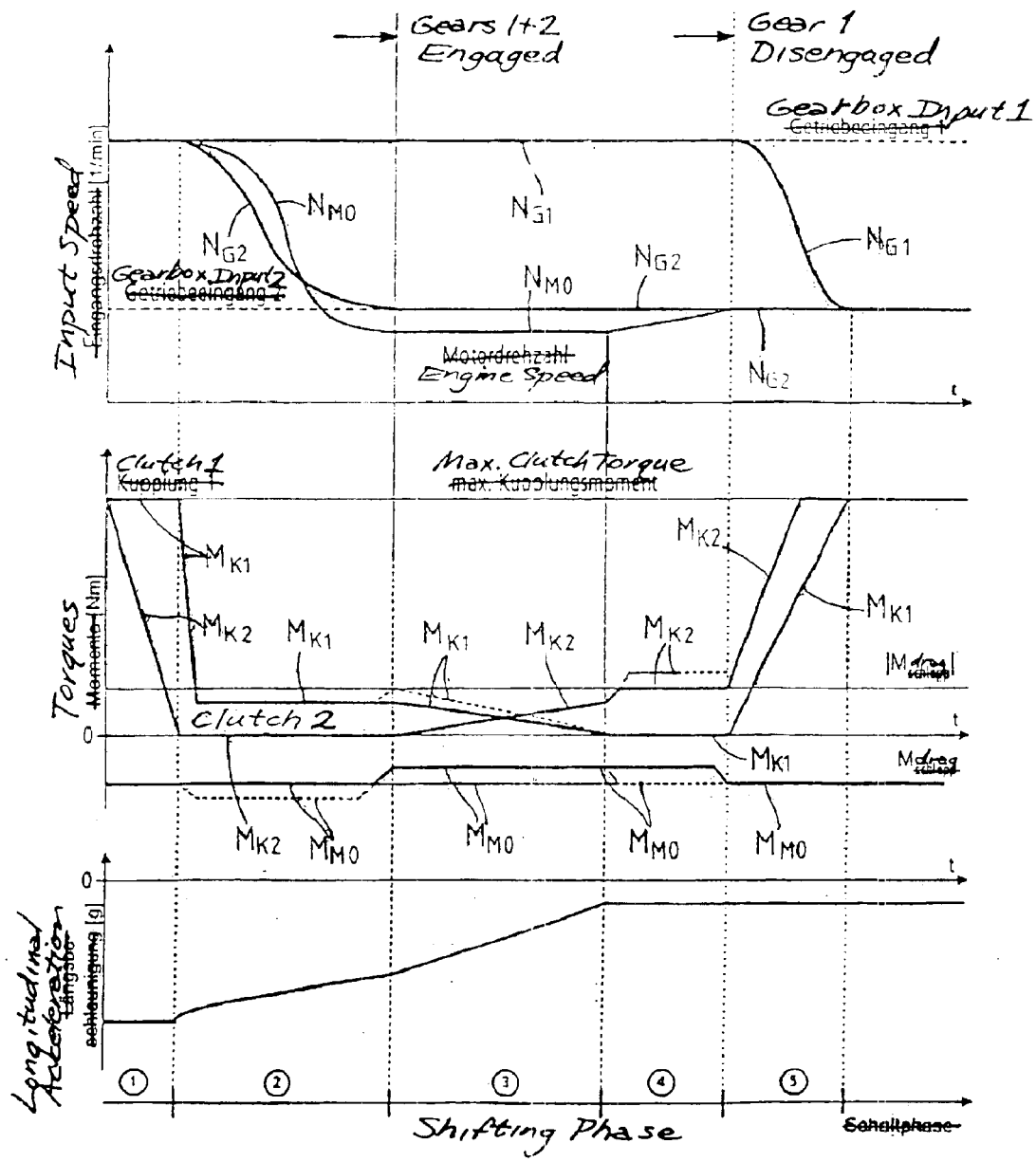
FIG. 4 is a diagram which illustrates one example of a shifting sequence according to the invention for upshifting under push-mode operating conditions.

With respect to push-mode upshifting, there is no need to give a separate example of how the transition phase can be prolonged beyond the pure crossover shifting phase; it is sufficient in this regard to refer to the example according to FIG. 4. By appropriate actuation of clutch arrangement 1 in the disengaging direction in phase II so that its torque-transmitting ability falls below the drag torque of the engine and possibly is decreased even further in the course of phase II in a certain desired manner, the drag torque present at gearbox input shaft 1 and thus also the transformed drag torque present at the gearbox output can also be reduced, so that, as early as phase II, the braking effect on the vehicle decreases and accordingly the vehicle deceleration (negative acceleration) is reduced; if desired, it can be reduced not just in an approximately linear manner but in a precisely linear manner. Another possibility is to intervene in engine management so that the drag torque of the engine itself is reduced to the appropriate extent. If an auxiliary unit such as a crankshaft starter-generator is present, it would be possible, during the crossover shifting in phase III, also to increase the drag torque acting on the gearbox input above the starting value and then to return it to the starting value again in phase IV. For this purpose, it would also be possible to use the vehicle brakes, which to this extent can be considered as an "auxiliary unit". The transition phase comprising crossover phase III can therefore be easily extended into both phases II and IV, for example.

Several examples have been given above to describe how the length of time during which the vehicle experiences change in its longitudinal acceleration or deceleration can be prolonged, which change can, with respect to the difference between the starting value before the shifting sequence and the final value after the shifting sequence, correspond exactly, if desired, or approximately to the change in the gearbox takeoff torque associated with the change in the gear ratio. This ability to prolong the transition period makes it possible to achieve two contradictory goals simultaneously, namely, the goal of providing a short or the shortest possible crossover shifting phase for the purpose of reducing the friction work in the clutch arrangements, i.e., the heat input to the clutch arrangements, and the goal of obtaining the most comfortable ride possible with only gradual changes in the longitudinal accelerations and decelerations and accordingly only gradual changes in the inertial forces acting on the vehicle's occupants. The inventive proposal can be applied in this regard both to wet-running disk clutch arrangements and also to dry-running clutch arrangements such as those of the friction disk type, where the inventive proposal for the latter application, that is, for dry-running clutch arrangements, is especially important, because the capacity of dry-running clutch arrangements to withstand frictional load is usually smaller than that of wet-running disk clutch arrangements and thus the load caused by friction is a much more important factor for dry clutches than for wet ones.

Additional exemplary shifting sequences are now explained in the following on the basis of FIGS. 11–14, which realize execution variants of an operating method according to the invention for a drive train, such as the drive train of FIG. 1 or FIG. 6. The shifting sequences can be realized, for example, by the use of the control unit 36, which actuates as appropriate the drive unit 12, the clutch arrangements 26 and 28, and—to the extent that it can be helpful—the auxiliary unit 50 as well as especially the vehicle brakes, possibly as a function of parameters specified in advance by the unit 38. The shifting sequences are preferably performed by the control unit 36 in fully automated fashion.

In the following explanations, the focus of which is on the differences from the shifting sequences of the preceding figures (it being assumed to this extent that these shifting sequences are known and understood), reference is made again to gearbox input shafts 1 and 2, to clutches 1 and 2, and to gears 1 and 2. Gearbox input shaft 1 can correspond to the shaft 20, and gearbox input shaft 2 can corresponding to the shaft 22 or vice versa. Accordingly, clutch 1 can correspond to clutch arrangement 26, and clutch 2 can correspond to clutch arrangement 28 or vice versa. Gear 1 is a gear (the starting gear) assigned to gearbox input shaft 1, and gear 2 is a gear (the target gear) assigned to gearbox input shaft 2.

The shifting sequences of FIGS. 11–14 pertain to push-mode downshifting. Reference is again made in this connection to the shifting sequences according to FIGS. 5 and 8, which also pertain to push-mode downshifting. According to FIGS. 5 and 8, the engine speed is brought down below the speed of the current gearbox input shaft (the one assigned to the starting gear) in phase II, i.e., phase B. An engine-supported synchronization of the target gear is therefore not possible, and thus the target gear must be synchronized by the associated gearbox synchronizing devices alone, which leads to a corresponding load on the synchronizing devices in question or in general on the synchronizing device or devices of the gearbox.

If it is desired to decrease the load on the synchronizing device or devices, one idea might be to accept the necessity of longer shifting times. The shifting times depend on the power which the synchronizing units must or can develop. The more slowly the gearbox input shaft in question is accelerated, the smaller the load on the associated synchronizing device. A significant increase in the shifting time, however, will usually be out of the question. At low temperatures, the shifting sequences for push-mode downshifting discussed above can be problematic under certain conditions, in the sense that, in the extreme case, it might not be possible to downshift in push mode at all. Even at normal operating temperatures, a rapid downshift can be problematic, especially a downshift from second gear to first gear, because here is where the spread of the gear ratios is the greatest.

Figure 11:
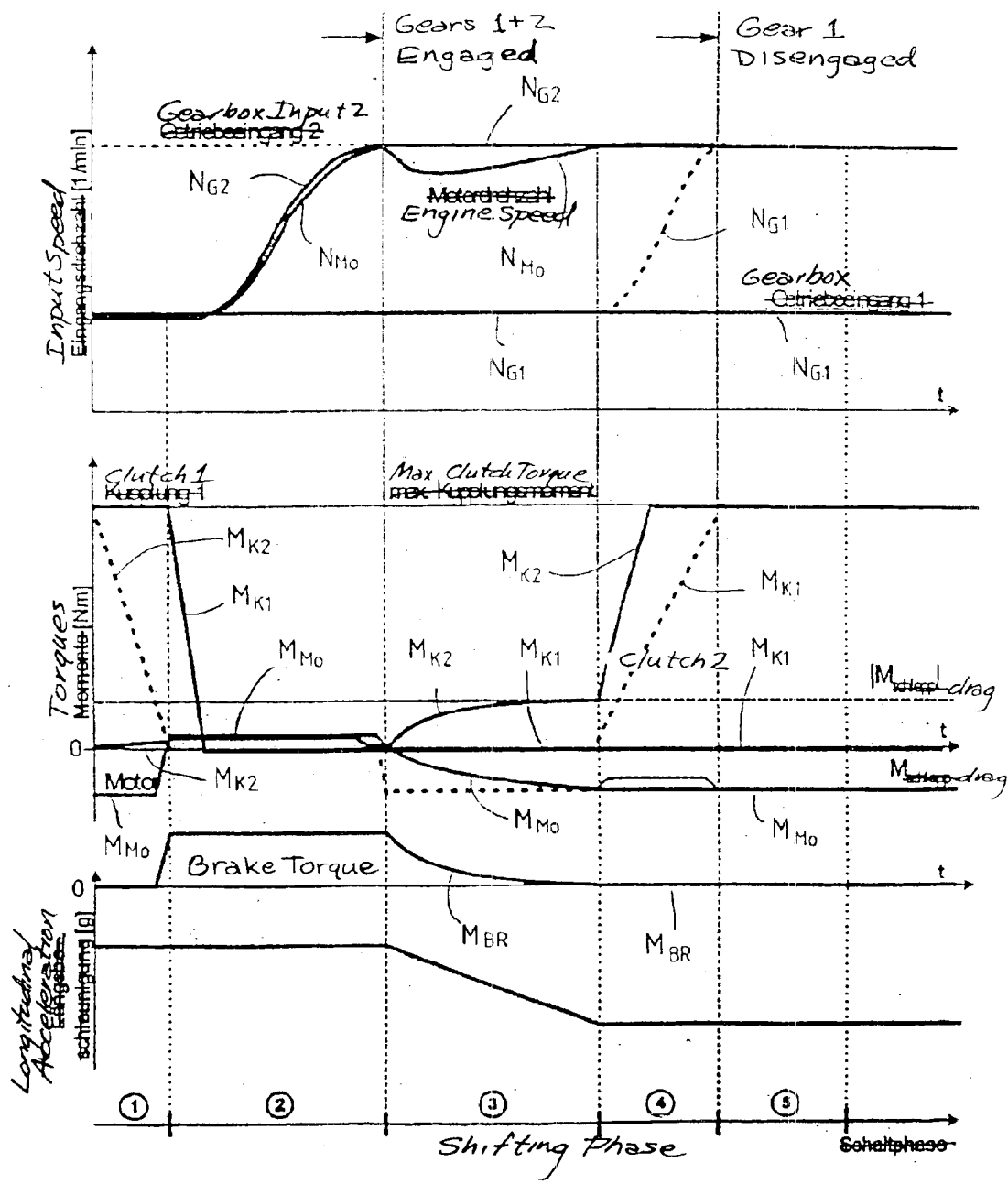
FIGS. 11–14 are diagrams which illustrate other examples of shifting sequences according to the invention for downshifting under push-mode operating conditions, in which active, brake-supported synchronization is provided.

In contrast, the shifting sequence illustrated by way of example in FIG. 11 offers the advantage that a push-mode downshift free of interruption in the pulling force is made possible while at the same time the synchronizing devices are relieved of load. An essential aspect is that a braking or drag torque of the drive unit is replaced by a substitute braking torque provided by a braking arrangement, especially by the normal brakes of the vehicle, in order to suppress an undesirable positive acceleration method while active synchronization is being performed by means of the engine (in general: the drive unit).

In phase I, clutch 1 is closed and transmits the maximum drag or braking torque of the drive unit (of the engine). Clutch 2 can be either open or closed at the beginning of the shifting sequence. If it is open, clutch 2 is actuated slightly in the engaging direction so that it can transmit drive torque from the engine to gearbox input shaft 1. If clutch 2 has been closed, clutch 1 is opened to the appropriate degree.

In phase II, clutch 1 assigned to the starting gear is opened essentially completely, and thus the clutch torque of this clutch is reduced approximately to zero. Without additional measures, the vehicle, which is in a push-mode state, would accelerate, or at least the previously prevailing deceleration of the vehicle (negative longitudinal acceleration) would decrease significantly. To suppress this undesirable positive acceleration method or decrease in vehicle deceleration, use is made of the vehicle brake system to apply a braking torque $M_{BR}$ to the running wheels of the motor vehicle or at least to the drive wheels of the motor vehicle, this torque corresponding to the previous drag torque or braking torque of the engine. Now the engine torque is increased to a positive value above the clutch torque of clutch 2, so that the engine speeds up to the synchronous speed of the target gear (gear 2). Gearbox input shaft 2 is being carried along by clutch 2 here, because clutch 2 is transmitting torque to its gearbox input shaft. When gearbox input shaft 2 reaches its new synchronous speed, clutch 2 is opened again, so that the new gear (target gear, gear 2) can be engaged essentially without any load on the synchronizing device of the gearbox. It is quite possible for the synchronizing device of the new gear to be actuated in the engaging direction even while the engine is being speeded up.

After the synchronous speed has been reached, the engine torque is gradually lowered back down to the original drag torque or braking torque in phase III, this being associated with a drop in engine speed. So that the engine speed does not fall too rapidly, it is advisable for the engine drag torque to be lowered at approximately the same rate as clutch 2 is being closed and its ability to transmit torque is increased, with the result that it can slow down the decrease in the speed of the engine. The basic idea in this connection is to close clutch 2 under open-loop control until the engine speed matches the new synchronous speed again. Clutch 2 then transmits the entire amount of engine drag torque. The open-loop control (it would also be possible to provide closed-loop control) preferably becomes more sensitive as the slip speed decreases in order to ensure an asymptotic approach of the engine speed to the speed of the gearbox input shaft. The braking torque applied by the vehicle brakes should be lowered under open-loop or closed-loop control as precisely as possible in the same way as the engine drag torque is built up at the gearbox output shaft by the engagement of clutch 2. At the power takeoff, therefore, there is always ideally a pushing torque present which, in phase III, corresponds to a continuous (possibly linear) transfer of the push torque provided by the drive unit before the start of the shifting sequence from gearbox input shaft 1 to gearbox input shaft 2. In phase III, a "crossover shift", so to speak, is carried out between the vehicle brakes and clutch 2 assigned to the target gear or the drive unit, so that the longitudinal acceleration shown at the bottom of FIG. 11 by way of example is achieved.

In phase IV, clutch 2 is then closed completely. The target gear can be disengaged, and clutch 1 can be closed, which leads to an increase in the speed $N_{G1}$ of gearbox input shaft 1 to the level of gearbox input shaft 2. Alternatively, clutch 1 can remain open.

Because the clutch torque of clutch 2 assigned to the target gear is greater than zero in phase II, gearbox input shaft 2 can be synchronized actively, which means that the synchronizing device in question is relieved of load. If clutch 2 were to remain completely open in phase II, the synchronizing device would have sole responsibility for the synchronization of gearbox input shaft 2.

The load-relieving effect on the synchronizing device or synchronizing devices of the gearbox does not depend on the substitution of a braking torque for the drag torque. A push-mode downshift can also be carried out without the help of the brakes in such a way as actively to decrease the load on the synchronizing device or devices. Without the help of the brakes, however, a positive intermediate acceleration or at least a temporarily reduction of the vehicle deceleration must be tolerated, which may not be desirable from the standpoint of a comfortable ride.

Figure 12:
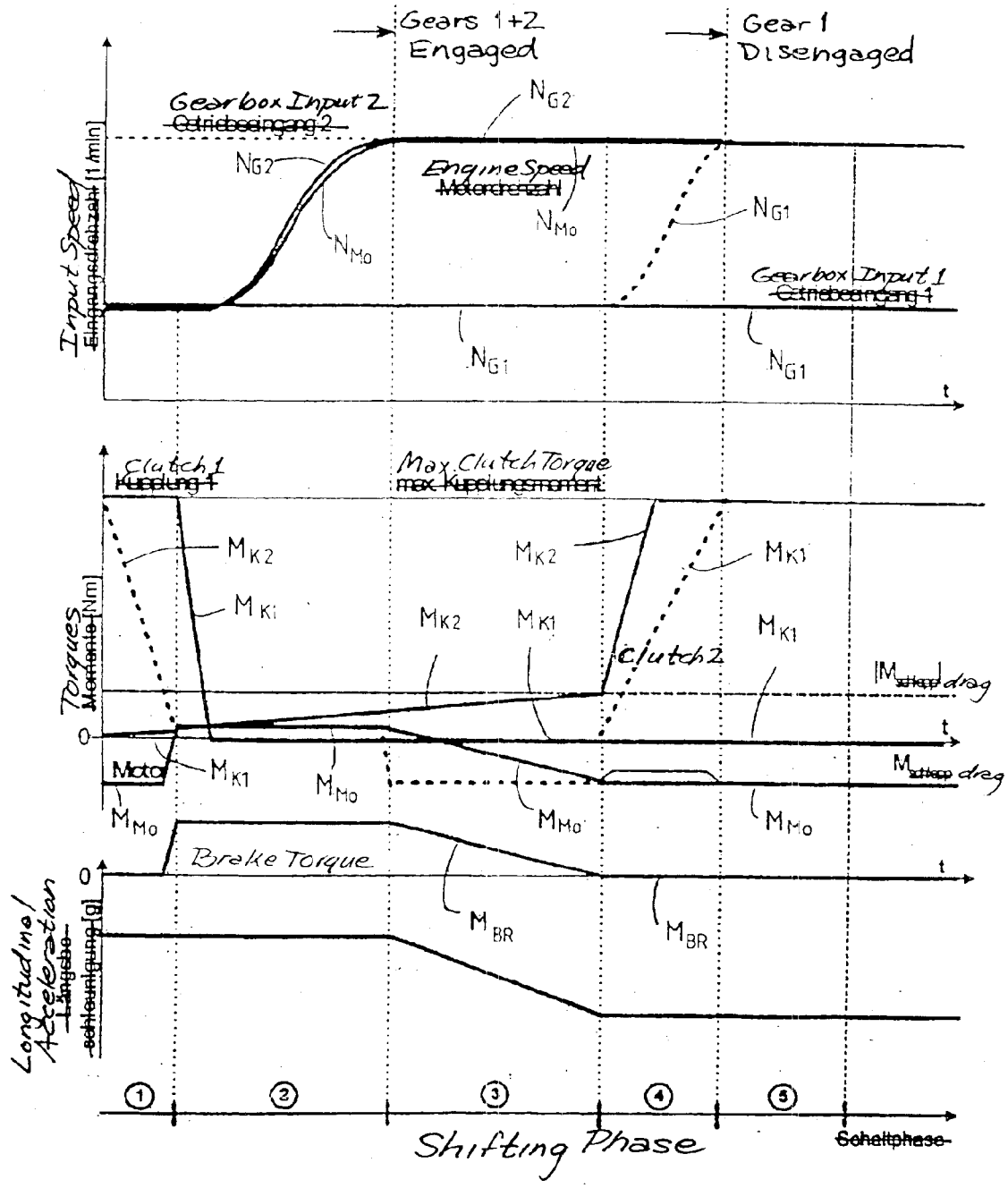

FIG. 12 shows an execution variant of the shifting sequence of FIG. 11. Because, at the beginning of phase III, according to FIG. 11, the speed of the drive unit and the speed of gearbox input shaft 1 assigned to the target gear are equal, clutch 2 can in principle be engaged as far as desired during this phase without causing a jerk in the drive train. For example, clutch 2 can be engaged at least far enough that the torque which can be transmitted by clutch 2 is the same as the engine braking torque or drag torque which was present at the beginning of the shifting sequence (for example, the maximum possible engine drag torque).

Against this background, clutch 2, beginning at zero in phase I and continuing until the end of phase III, is closed in a controlled manner on the basis of, for example, an appropriate "pressure ramp", so that, by the end of phase III, the transmittable clutch torque corresponds to the indicated engine drag torque. In phase III, the engine torque and the braking torque are reduced in coordination with each other in the manner of a "crossover shift" in order to achieve, for example, the change in longitudinal acceleration shown at the bottom of FIG. 12. Overall, a braking torque, which changes continuously in phase III and which is the sum of the braking torque $M_{BR}$ applied by the vehicle brakes and the engine torque $M_{MO}$ being transmitted at the moment in question via the gearbox or more precisely by target gear 2 and clutch 2, is present at the power takeoff, i.e., at the vehicle's wheels. The determining factor here is not the torque $M_{MO}$ introduced into the gearbox but rather the torque at the gearbox output resulting from the torque $M_{MO}$ under consideration of the gear ratio.

Figure 13:
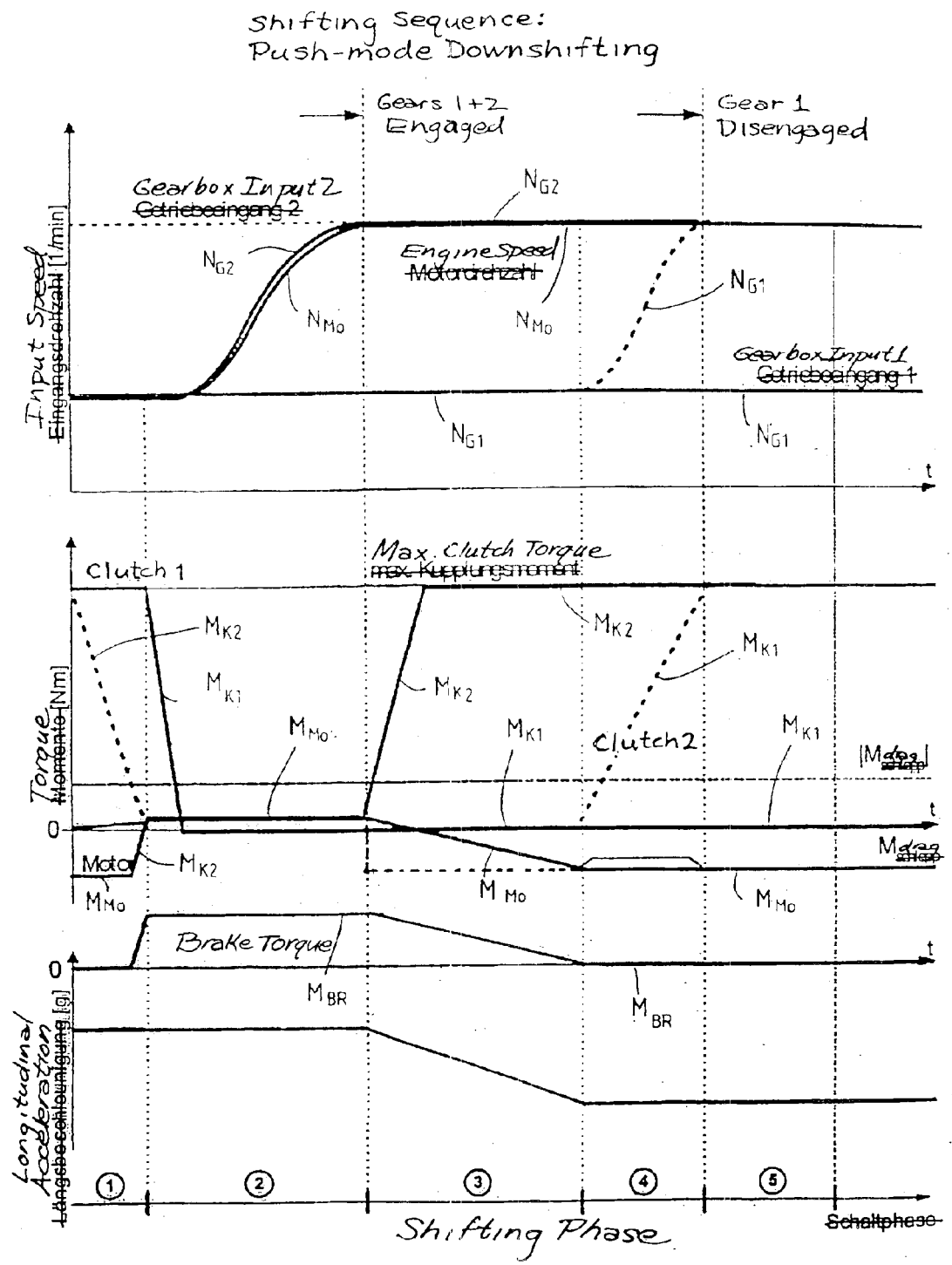

FIG. 13 shows another execution variant of the shifting sequence. In this sequence, clutch 2 assigned to the target gear is already completely closed in phase III. Otherwise, the sequence is the same as the shifting sequence shown in FIG. 12.

Figure 14:
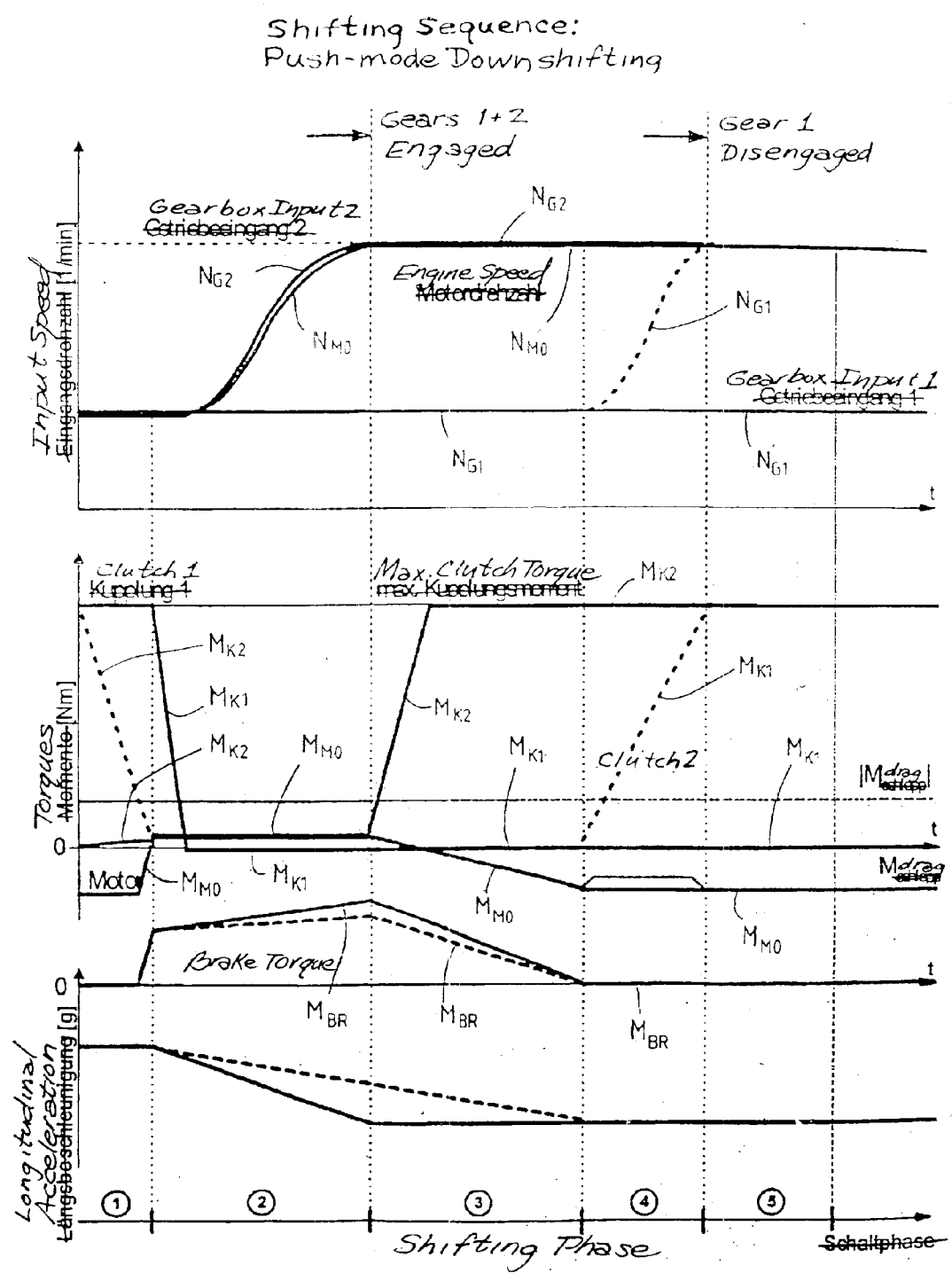

The shifting sequence according to FIG. 14 shows two variants of the sequence according to FIG. 13. According to a first variant (solid braking torque curve and solid longitudinal acceleration curve), the braking torque is increased in linear fashion in phase II, accompanied by a corresponding increase in the absolute value of the negative longitudinal acceleration. In phase III, the braking torque is then changed to the same extent (that is, at the same rate of change) as the engine torque (the engine torque being changed from a slightly positive torque to a negative drag torque or braking torque), so that the longitudinal acceleration of the vehicle remains essentially constant in phase III.

In contrast, in the second variant (braking torque curve in broken line and longitudinal acceleration curve in broken line), the braking torque is increased to a lesser extent in phase II, and in phase III the rate of change of the braking torque $M_{BR}$ is slower than the rate of change of the engine torque $M_{MO}$, so that a strictly monotonic increase, in the present case a linear increase, in the braking action on the vehicle is obtained, and therefore a linear increase is obtained in the absolute value of the negative longitudinal acceleration, extending across phases II and III.

The two variants in FIG. 14 give two versions of the shifting sequence for push-mode downshifting, in which, so to speak, a spontaneous deceleration is produced as soon as the command is given to downshift in push mode, namely, right from the beginning of phase II. This may be advantageous with respect to the psychology of a typical driver, because he expects the motor vehicle to react spontaneously to the shift commands which he issues in manual shifting mode.

The following aspects must also be considered: For the sake of a comfortable ride, it would certainly be ideal if interruptions in the pulling or pushing force could always be avoided during shifting operations. Within the scope of the invention, however, it is quite possible to provide that, in certain situations, an interruption in the pushing or pulling force can be tolerated in order to reduce the friction work performed by the clutches and/or by the synchronizing devices or to eliminate as much of this friction work as possible. The idea in this connection is directed in particular at certain situations in push mode. If the longitudinal acceleration (which is negative in push mode) of the vehicle is slow, the driver or the vehicle's occupants will not object to a comparatively small change in the longitudinal acceleration caused by an interruption in the pushing force and will not perceive it as a sacrifice of comfort. This applies both to a push-mode downshift and to a push-mode upshift. In the case of a push-mode upshift, it is also true that the longitudinal acceleration of the vehicle will increase after the shift as a result of the decrease in the braking action of the engine. A short intermediate period of slight acceleration or free coasting of the vehicle as a result of the interruption in the pushing force would probably also be readily accepted.

What was just said above also applies in a corresponding manner to pull-mode states. If the (positive) longitudinal acceleration of the vehicle is slow, the driver or the vehicle's occupants will not object to comparatively slight changes in the longitudinal acceleration caused by an interruption in the pulling force and not perceive it as a loss of comfort.

It is proposed in particular here, both for pull-mode operating conditions and for push-mode operating conditions, that, on the basis of the absolute value of the instantaneous longitudinal acceleration of the vehicle, a decision be made as to whether the shift is to be accomplished with an interruption in the pulling or pushing force or without an interruption in the pulling or pushing force. The corresponding shifting sequence can then be carried out in automated fashion by the appropriate functions of a control unit.

Insofar as an interruption in the pushing force occurs in and of itself, the pushing torque of the drive unit can be replaced by a braking torque of a brake device, especially the vehicle brakes, in correspondence with the proposals on which FIGS. 11–13 are based. In the load-free state of the drive train obtained after the disengagement of the clutch arrangement assigned to the starting gear, active synchronization can be performed advantageously by adjusting the engine speed actively to the synchronize speed of the target gear. Eliminating the "crossover shift" between the two clutch arrangements minimizes the friction work of the two clutch arrangements, i.e., of their friction linings.

Reducing the friction work in the clutch arrangements is of interest especially for dry-running clutch arrangements of a multi-clutch device, especially of a double clutch, in order to protect the friction linings and to prolong the service life of the friction linings. According to a conventional approach, the advantage of the double-clutch gearbox, namely, the ability to shift gears in the gearbox without any interruption in the pulling or pushing force, is exploited at all times, regardless of the driving situation, by performing the known "crossover shifting", during which the one clutch arrangement is closed and simultaneously the other clutch arrangement is opened, while a gear is engaged on each of the two gearbox input shafts, namely, the starting gear on the one gearbox input shaft and the target gear on the other gearbox input shaft. The frictional energy which develops during the transfer of torque from the one clutch arrangement to the other leads to the wear of the linings and to the input of heat into the clutch arrangements, possibly into the pressure plates. It was recognized that it is not necessary to perform this basic shifting sequence all the time, independently of the driving situation. If it is decided to do without the freedom from interruptions in the pulling or pushing force in certain shifting situations, the friction linings can be relieved of a corresponding amount of wear.

Figure 15:
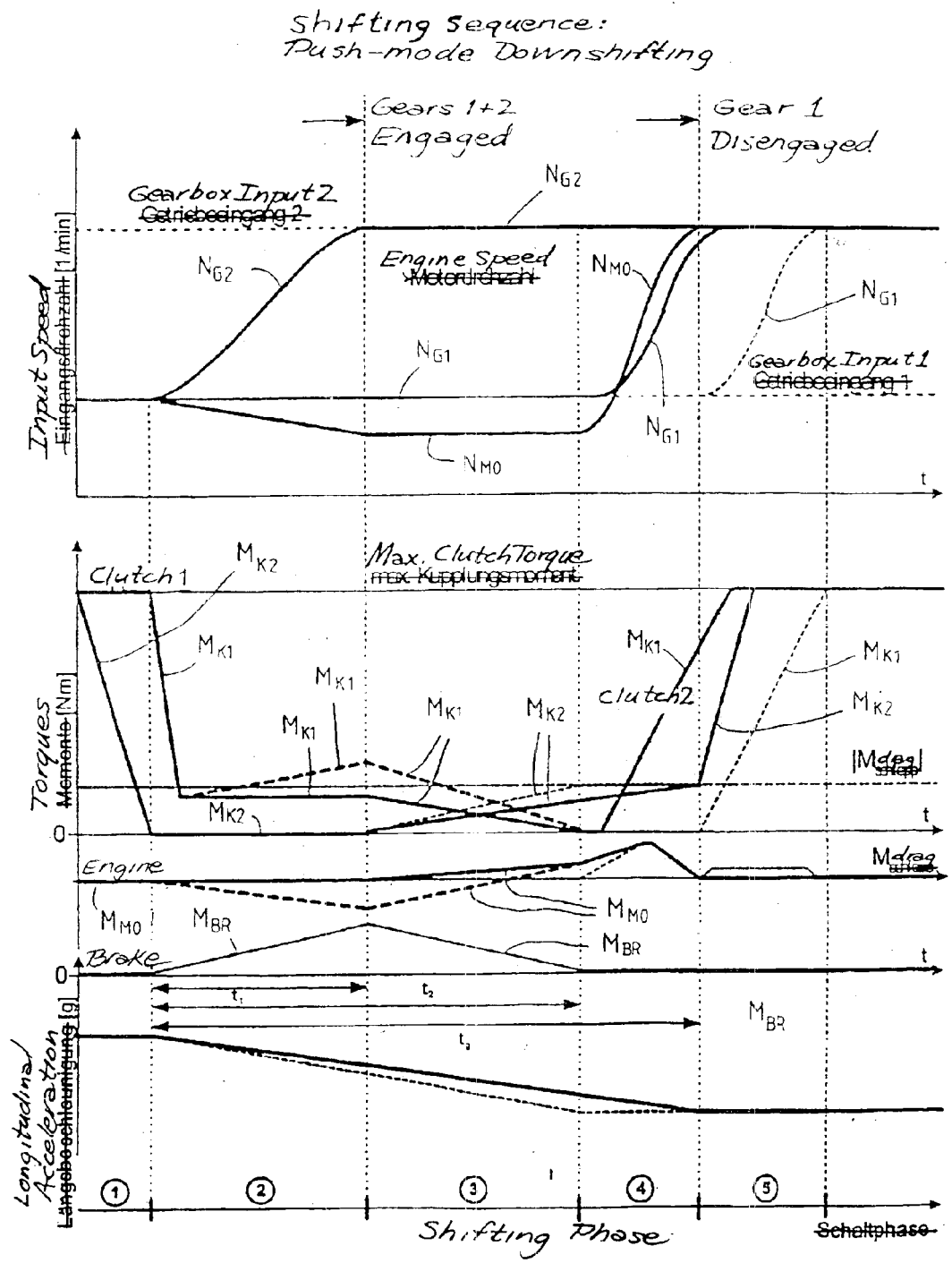
FIG. 15 is a diagram which illustrates another example of a shifting sequence according to the invention for downshifting under push-mode operating conditions.

The shifting sequence of FIG. 15, which represents a push-mode downshift sequence, is intended to provide another example of the idea on which the exemplary embodiments of FIGS. 7–10 are based, namely, the reduction of the friction work by reducing the length of the crossover shifting phase (to the extent that such a phase is still used at all during push-mode downshifts) and the inclusion of a transition phase which is longer than the crossover shifting phase. The assumptions and the nomenclature described above in reference to FIGS. 7–9 also apply to the exemplary embodiment of FIG. 15.

According to FIG. 15, the change (increase) in the engine-induced braking torque acting on the driven wheels of the vehicle and thus the increase in the absolute value of the negative longitudinal acceleration of the vehicle in phase II which are associated with the crossover shifting which takes place during the push-mode downshift are already anticipated, so to speak, by the corresponding actuation of the vehicle brakes. According to the engine torque shown in broken line, it would also be possible to use a crankshaft starter-generator or the like to provide a negative torque contribution. In general, it is possible to obtain the appropriate negative torque by the appropriate actuation/control of the torque-generating arrangement and especially by the appropriate actuation of the vehicle brakes and/or by the appropriate actuation of the crankshaft starter-generator.

According to the shifting sequence of FIG. 15, the braking torque $M_{BR}$ is increased in linear fashion in phase II, this being accompanied by a corresponding change in the longitudinal acceleration of the vehicle. In phase III, the crossover shift is carried out to transfer the engine drag torque from gearbox input shaft 1 to gearbox input shaft 2. Reference can be made here to the solid clutch torque curves. If, in addition, the crankshaft starter-generator is used in the manner described, a "drive drag torque", so to speak, is obtained, the absolute value of which increases in linear fashion during phase II; and the torque-transmitting capacity of clutch 1 must be increased (i.e., the degree to which clutch 1 is engaged must be increased) at least to the point that all of the drag torque (consisting of the drag torque of the engine and the drag torque of the crankshaft starter-generator) can be transmitted to gearbox input shaft 1.

In phase III, the braking torque and—if used—the drag torque of the crankshaft starter-generator are reduced again in order to obtain the course of the longitudinal vehicle acceleration shown in the diagram. It must be added here that two variants are shown. According to the solid longitudinal acceleration curve, to which the solid torque curve for clutch arrangement 2 belongs, a transition phase extending over phases II, III, and IV is obtained. According to the longitudinal acceleration curve shown in broken line, to which the broken torque curve for clutch arrangement 2 belongs, the transition phase extends only over phases II and III.

The exemplary embodiment of FIG. 15 is intended to show by way of example primarily how a brake-generated gradient phase, which precedes (or follows) the actual crossover phase itself can be used to achieve a transition phase which is significantly longer than the crossover shifting phase.

What is claimed is:
1. Method for operating a drive train belonging to a motor vehicle, the drive train being provided with:

torque-generating device comprising at least one drive unit;

a gearbox comprising a synchronizing device, at least one gearbox output shaft, a first gearbox input shaft assigned at least to a first gear, and a second gearbox input shaft assigned at least to a second gear;

a multi-clutch device installed between the drive unit and the gearbox to transmit torque between the drive unit and the gearbox, said multi-clutch device comprising a first clutch arrangement assigned to the first gearbox input shaft and a second clutch arrangement assigned to the second gearbox input shaft wherein said clutch arrangements can be actuated independently of each other, said method comprising, during a shifting sequence in at least one of a pull-mode operating state and a push-mode operating state of the drive train, shifting between said first gear and said second gear by actuating the clutch arrangements and controlling the torque-generating device so that at least one of the following criteria is fulfilled:

(a) during a transition phase in the shifting sequence, a monotonically changing torque is present at the gearbox output shaft, where the difference between the torque at the beginning of the transition phase and the torque at the end of the transition phase corresponds essentially to the change in the gear ratio of the gearbox which occurs during the shifting method;

(b) during the shifting sequence, the torque present at the gearbox output shaft remains essentially the same before and after the transition phase;

(c) during the shifting sequence, a gearbox input torque, which remains essentially constant and which corresponds for a certain period of time to the sum of a first torque contribution introduced via the first gearbox input shaft and a second torque contribution introduced via the second gearbox input shaft, is introduced into the gearbox via the gearbox input shafts; and (d) during the shifting sequence, it is achieved that the vehicle accelerates in one of an essentially monotonically rising and an essentially monotonically falling manner.

2. Method according to claim 1, wherein criterion (a) is fulfilled during the shifting sequence.

3. Method according to claim 1, wherein criteria (a) and (b) are fulfilled jointly during the shifting sequence.

4. Method according to claim 1, wherein criterion (c) is fulfilled during the shifting sequence.

5. Method according to claim 1, wherein criterion (d) is fulfilled during the shifting sequence.

6. Method according to claim 1, wherein at least one of said criteria is fulfilled during upshifting from a lower gear to a higher gear.

7. Method according to claim 1, wherein at least one of said criteria is fulfilled during downshifting from a higher gear to a lower gear.

8. Method according to claim 1, wherein at least one of said criteria is fulfilled both in the pull-mode operating state and in the push-mode operating state.

9. Method according to claim 1, wherein the shifting sequence comprises actuating the first clutch arrangement so as to disengage it at least substantially completely before engaging the second gear.

10. Method according to claim 1, wherein the shifting sequence comprises actuating the second clutch arrangement so as to reduce the torque which can be transmitted by the second clutch arrangement at least one of before and during the engaging of the second gear.

11. Method according to claim 10, wherein, in a pull-mode operating state, the torque which can be transmitted by the second clutch arrangement is adjusted to a value which is approximately equal to the torque which is being provided by the torque-generating arrangement.

12. Method according to claim 10, wherein, in a push-mode operating state, the torque which can be transmitted by the second clutch arrangement is adjusted so that its absolute value is below the torque which is being provided by the torque-generating arrangement.

13. Method according to claim 1, wherein the shifting sequence comprises actuating the torque-generating arrangement so that the torque provided by the torque-generating arrangement is one of increased and decreased at least one of before during, and after the second gear is engaged.

14. Method according to claim 1 further comprising compensating for a torque contribution based on the acceleration or braking of a centrifugal mass arrangement which occurs in association with the engagement of the second gear at least one of providing a corresponding compensating torque contribution by the torque-generating arrangement and actuating the first clutch arrangement.

15. Method according to claim 1 comprising bringing the first clutch arrangement into a state of slip, actuating the second clutch arrangement in the engaging direction, and actuating the first clutch arrangement in the disengaging direction.

16. Method according to claim 15, wherein the clutch arrangements are actuated in coordination with each other so that the total torque transmitted by the clutch arrangements remains essentially constant.

17. Method according to claim 15, wherein the clutch arrangements are actuated in coordination with each other in such a way that a selected slip speed is kept constant.

18. Method according to claim 15, wherein the second clutch arrangement actuated under open-loop control in the engaging direction, and the first clutch arrangement is actuated under closed-loop control in the disengaging direction.

19. Method according to claim 15, wherein one first clutch arrangement is actuated under open-loop control in the disengaging direction, and the second clutch arrangement is actuated under closed-loop control in the engaging direction.

20. Method according to claim 1 comprising, in the pull-mode operating state, the adjusting torque which can be transmitted by the second clutch arrangement to a value which is approximately the same as the torque provided by the torque-generating device, and controlling the torque-generating device so as to lower the torque it is providing in order that the speed of the torque-generating arrangement can be brought at least approximately to the speed of the second gearbox input shaft.

21. Method according to claim 1 comprising, in the push-mode operating state, adjusting the torque which can be transmitted by the second clutch arrangement to a value which is approximately the same as the torque provided by the torque-generating device, and at least one of controlling the torque-generating device in such a way and actuating the second clutch arrangement in such a way that the absolute value of the torque which can be transmitted by the second clutch arrangement is greater than the torque being provided simultaneously by the torque-generating arrangement in order that the speed of the torque-generating arrangement can be brought at least approximately to the speed of the second gearbox input shaft.

22. Method according to claim 20 further comprising compensating for a torque contribution caused by the acceleration or braking of a centrifugal mass arrangement which occurs when the two speeds approach each other.

23. Method according to claim 20 further comprising, when the speed of the torque-generating arrangement reaches approximately the speed of the second gearbox input shaft, engaging the second clutch arrangement essentially completely.

24. Method according to claim 21 further comprising when the speed of the torque-generating arrangement reaches approximately the speed of the second gearbox input shaft, engaging the first clutch arrangement at least far enough that the speed of the first gearbox input shaft is brought at least approximately to the speed of the second gearbox input shaft.

25. Method according to claim 24, further comprising compensating for a torque contribution caused by the acceleration or braking of a centrifugal mass arrangement which occurs when the two speeds approach each other by providing a corresponding compensating torque contribution from the torque-generating arrangement.

26. Method according to claim 20 further comprising, when the speed of the torque-generating arrangement reaches approximately the speed of the second gearbox input shaft, controlling the torque-generating arrangement in such a way that it provides a torque which is at least approximately the same as the torque provided by the torque-generating device before the shifting sequence.

27. Method according to claim 1, wherein said torque generating device further comprises an auxiliary unit for producing an auxiliary torque, said auxiliary unit comprising at least one of a crankshaft starter-generator and a brake arrangement.

28. Method according to claim 27, wherein, in at least one phase of the shifting sequence, the torque provided by the torque-generating arrangement comprises a torque contribution from the drive unit and a torque contribution provided from the auxiliary unit.

29. Method according to claim 1, wherein the transition phase comprises a crossover shifting phase, during which the clutch arrangements are actuated in opposite directions in order to transfer the torque to be transmitted between the drive unit and the gearbox from the first gearbox input shaft to the second gearbox input shaft.

30. Method according to claim 29, wherein the transition phase consists essentially of said
crossover shifting phase, and
at least one of a gradient phase which precedes the crossover shifting phase and a gradient phase which follows the crossover shifting phase, during which a monotomc change in the torque present at the gearbox output shaft is obtained by at least one of controlling the torque-generating arrangement and actuating one of the first and second clutch arrangements.

31. Method according to claim 29 comprising during the crossover shifting phase, actuating the clutch arrangements in such a way that a strictly monotonic change in the torque present at the gearbox output shaft is achieved.

32. Method according to claim 30 comprising, during at least one of the gradient phase preceding the crossover shifting phase and the gradient phase following the crossover shifting phase, at least one of controlling the torque-generating arrangement and actuating one of the clutch arrangements so that a strictly monotonic change in the torque present at the gearbox output shaft is achieved.

33. Method according to claim 32, wherein the at least one of controlling and actuating is such that a strictly monotonic change in the torque present at the gearbox output shaft is achieved over the entire transition phase.

34. Method according to claim 30, wherein the monotonic change in the torque present at the gearbox output shaft is adjusted during at least one of the gradient phase preceding the crossover shifting phase and the gradient phase following the crossover shifting phase on the basis of the change in the torque occurring at the gearbox output shaft associated with the change in the gear ratio which occurs during the shift.

35. Method according to claim 34, wherein the monotonic, change in the torque present at the gearbox output shaft is adjusted during the gradient phase in question on the basis of one of a nominal torque gradient and nominal acceleration gradient, and at least one of a predetermined time period for the crossover shifting phase a predetermined time period for the gradient phase in question, a predetermined time period for the transition phase, a gear ratio assigned to the starting gear, a gear ratio assigned to the target gear, an instantaneous drive torque or drag torque of the drive unit, and a desired torque of the drive unit.

36. Method according to claim 30 comprising, during upshifting from said first gear to said second gear in a pull-mode operating state, lowering at least one of the drive torque provided by the drive unit and the torque transmitted by the first clutch arrangement monotonically, from a starting value to an intermediate value during the gradient phase preceding the crossover shifting phase.

37. Method according to claim 36 comprising, during the crossover shifting phase increasing, the drive torque provided by the drive unit monotonically from the intermediate value.

38. Method according to claim 37, comprising increasing the drive torque provided by the drive unit to another intermediate value above the starting value during the crossover shifting phase and then, during the course of the gradient phase following the crossover shifting phase, bringing the torque from the additional intermediate value to a final value corresponding at least approximately to the starting value.

39. Method according to claim 38 comprising, during the gradient phase following the crossover shifting phase, one of bringing the drive torque provided by the drive unit from the additional intermediate value to a value below the starting value and then raising the torque to the final value, and lowering the torque which can be transmitted by the second clutch arrangement monotonically from an intermediate value prevailing at the end of the crossover shifting phase and then increasing the torque which can be transmitted by the second clutch arrangement after the torque provided by the drive unit has reached the final value.

40. Method according to claim 30 comprising, when shifting from the first gear to the second gear in a pull-mode operating state, increasing at least one of the drive torque provided by the drive unit and the torque which has been or can be transmitted by the first clutch arrangement during the gradient phase preceding the crossover shifting phase monotonically, from a starting value to an intermediate value.

41. Method according to claim 40, comprising decreasing the drive torque provided by the drive unit during the crossover shifting phase monotonically from the intermediate value.

42. Method according to claim 41, comprising decreasing the drive torque provided by the drive unit during the crossover shifting phase to an additional intermediate value below the starting value and then, during the course of the gradient phase following the crossover shifting phase, bringing the torque from the additional intermediate value to a final value corresponding at least approximately to the starting value.

43. Method according to claim 42 comprising increasing a torque which has been or can be transmitted by the clutch arrangement assigned to the second gear is increased during the gradient phase following the crossover shifting phase monotonically from the intermediate value prevailing at the end of the crossover shifting phase to the final value.

44. Method according to claim 30 wherein, when downshifting from a higher gear to a lower gear in the push-mode operating state, the drag torque applied by the drive unit is reduced during the crossover shifting phase monotonically from a starting value to an intermediate value.

45. Method according to claim 44, further comprising reducing the drag torque applied by the drive unit from the intermediate value during the course of the gradient phase following the crossover shifting phase and then bringing the drag torque to a final value corresponding at least approximately to the starting value.

46. Method according to claim 45, comprising increasing a torque which has been or can be transmitted by the clutch arrangement assigned to the lower gear during the gradient phase following the crossover shifting phase monotonically from the intermediate value prevailing at the end of the crossover shifting phase to the final value.

47. Method according to claim 30 comprising when upshifting from a lower gear to a higher gear in the push-mode operating state, reducing the drag torque being applied by the drive unit during the gradient phase preceding the crossover shifting phase monotonically from a starting value to an intermediate value, and decreasing the torque which has been or can be transmitted by the clutch arrangement assigned to the lower gear is decreased during the gradient phase preceding the crossover shifting phase monotonically from a starting value to an intermediate value.

48. Method according to claim 47, comprising decreasing the absolute value of the torque which can be transmitted by the clutch arrangement assigned to the lower gear during the gradient phase below the drag torque applied by the drive unit.

49. Method according to claim 30 wherein the transition phase is formed at least in part by a braking phase, in which a monotonic change in the torque acting on the vehicle is brought about by the appropriate actuation of the vehicle brakes acting on the running wheels of the vehicle in coordination with the actuation of at least one of the clutch arrangements at least during one sub-phase of the braking phase.

50. Method according to claim 49 wherein at least one of the gradient phase preceding the crossover shifting phase and the gradient phase following the crossover shifting phase is formed at least in part by a braking phase.

51. Method according to claim 1 comprising at least partially replacing a braking torque of the drive unit occurring in a push-mode operating state during at least one phase of the shifting sequence from a starting gear to a target gear by a substitute braking torque applied by a braking arrangement of the vehicle.

52. Method according to claim 51 comprising:
(i) actuating the clutch arrangement which is assigned to the starting gear and which was previously introducing the braking torque of the drive unit into the gearbox in the disengaging direction, and
(ii) actuating the brake arrangement in such a way as to generate the substitute braking torque.

53. Method according to claim 52 wherein at least initially, the substitute braking torque corresponds essentially to the braking torque previously transmitted by the clutch arrangement assigned to the starting gear, where this clutch arrangement, as a result of the actuation in the disengaging direction, is preferably no longer transmitting any essential amount of torque; or at least initially, a total braking torque consisting of the substitute braking torque and a residual torque still being transmitted by the clutch arrangement assigned to the starting gear corresponds essentially to the braking torque transmitted previously by the clutch arrangement assigned to the starting gear.

54. Method according to claim 51 wherein the substitute braking torque is reduced continuously in coordination with at least one of the actuation of the clutch arrangement assigned to the target gear in the engaging direction and a change in the instantaneous torque provided by the drive unit so as to reduce the positive instantaneous drive torque of the drive unit or so as to increase the instantaneous braking torque of the drive unit.

55. Method according to claim 54, comprising reducing the substitute braking moment in such a way that the total braking torque acting on the vehicle consisting of the instantaneous torque provided by the drive unit and the instantaneous braking action of the braking arrangement changes monotonically.

56. Method according to claim 55 comprising reducing the substitute braking torque is reduced in correspondence with the continuous change in the torque being introduced via the clutch device into the gearbox on the basis of the torque provided by the drive unit, so that the substitute braking torque essentially disappears by the time the clutch arrangement assigned to the target gear is transmitting essentially all of the braking torque or a predetermined braking torque of the drive unit.

57. Method according to claim 51 comprising in preparation for downshifting from a higher gear to a lower gear in the push-mode operating state, disengaging the clutch arrangement assigned to the starting gear essentially completely in a preparatory phase of the shifting sequence; controlling the drive unit to provide a positive drive torque; and bringing the clutch arrangement assigned to the target gear into a partially engaged, acceleration torque-transmitting state corresponding to a partial engagement of the clutch arrangement so that the gearbox input shaft assigned to the target gear is accelerated jointly with the drive unit itself by the positive drive torque acting by way of this clutch arrangement toward a synchronous speed assigned to the target gear.

58. Method according to claim 57 comprising engaging the lower gear when the speed of the gearbox input shaft assigned to the lower gear has essentially reached the synchronous speed or has approached the synchronous speed in correspondence with a predetermined threshold range of the speed differential.

59. Method according to claim 58 comprising at least by the time the lower gear is engaged changing the torque provided by the drive unit continuously until the supplied braking torque has reached a predetermined value.

60. Method according to claim 1 wherein said pull-mode comprises first and second pull-mode operating states, where, for the first pull-mode operating state, in which a shift is made between the first gear and the second gear in the manner of one of an upshift and a downshift, the clutch arrangements are actuated and the torque-generating arrangement is controlled in such a way that at least one of the criteria (a)–(d) pertaining to the shifting sequence is fulfilled, and where, for the second type of pull-mode operating state, the demand for the fulfillment of at least one of criteria (a)–(d) pertaining to the shifting sequence is eliminated and the shifting sequence is carried out in such a way that an interruption in the pulling force occurs.

61. Method according to claim 1 wherein said push-mode comprises first and second push-mode operating states, where, for the first type of push-mode state, in which a shift is made between the first gear and the second gear in the manner of one of an upshift and a downshift, the clutch arrangements are actuated in such a way and the torque-generating arrangement is controlled in such a way that at least one of criteria (a)–(d) pertaining to the shifting sequence is fulfilled, and where, for the second type of push-mode state, the demand for the fulfillment of at least one of criteria (a)–(d) pertaining to the shifting sequence is eliminated and the shifting sequence is carried out in such a way that an interruption in the pushing force occurs.

62. Method according to claim 49 wherein the crossover shifting phase comprises a braking phase or overlaps with a braking phase.

63. Method as in claim 50 wherein the crossover shifting phase comprises a braking phase or overlaps with a braking phase.

64. Drive train for a motor vehicle, said drive train comprising:

a torque-generating arrangement, which comprises at least one drive unit;

a gearbox comprising a synchronizing device, at least one gearbox output shaft, where a first gearbox input shaft assigned to at least one first gear, and a second gearbox input shaft is assigned to at least one second gear;

a multi-clutch device installed between the drive unit and the gearbox to transmit torque between the drive unit and the gearbox said multi-clutch device comprising a first clutch arrangement assigned to the first gearbox input shaft and a second clutch arrangement assigned to the second gearbox input shaft wherein said clutch arrangements can be actuated independently of each other, and a control unit assigned to the drive train, which unit is designed to control the torque-generating arrangement and to actuate the clutch device in conjunction with a method for shifting between a first and a second gear in such a way as to achieve at least one of the following:

maintaining an at least approximately constant torque at the gearbox output shaft both before and after a transition phase during which the torque transmitted by the gearbox to the gearbox output shaft changes monotonically in correspondence with the change in the gear ratio which occurs during the shift, and achieving an essentially monotonic increase in the vehicle acceleration, and achieving an essentially monotonic decrease in the vehicle acceleration.

65. Drive train according to claim 64 further comprising an auxiliary unit for achieving an auxiliary torque, wherein the auxiliary unit comprises one of a crankshaft starter-generator and a brake arrangement.

66. Drive train according to claim 64 wherein the clutch arrangements are wet-running disk clutch arrangements.

67. Drive train according to claim 64 wherein the clutch arrangements are dry-running clutch arrangements.

* * * * *